United States Patent
Patel et al.

(10) Patent No.: US 9,318,813 B2
(45) Date of Patent: Apr. 19, 2016

(54) SIGNAL PROCESSING BLOCK FOR A RECEIVER IN WIRELESS COMMUNICATION

(75) Inventors: Dimpesh Patel, North York (CA); Glenn Gulak, Toronto (CA); Mahdi Shabany, Tehran (IR)

(73) Assignee: MaxLinear, Inc., Carlsbad, CA (US)

(*) Notice: Subject to any disclaimer, the term of this patent is extended or adjusted under 35 U.S.C. 154(b) by 624 days.

(21) Appl. No.: 12/786,288

(22) Filed: May 24, 2010

(65) Prior Publication Data

US 2011/0264721 A1 Oct. 27, 2011

Related U.S. Application Data

(60) Provisional application No. 61/180,536, filed on May 22, 2009.

(51) Int. Cl.
G06F 17/16 (2006.01)
H01Q 23/00 (2006.01)
H01Q 21/28 (2006.01)

(52) U.S. Cl.
CPC ............... *H01Q 23/00* (2013.01); *G06F 17/16* (2013.01); *H01Q 21/28* (2013.01)

(58) Field of Classification Search
None
See application file for complete search history.

(56) References Cited

U.S. PATENT DOCUMENTS

| | | |
|---|---|---|
| 6,675,187 B1 | 1/2004 | Greenberger |
| 7,489,746 B1 | 2/2009 | Awater et al. |
| 8,255,775 B2 | 8/2012 | Chang et al. |
| 8,266,510 B1 | 9/2012 | Chen et al. |
| 8,351,549 B1 | 1/2013 | Choi et al. |
| 8,670,508 B2 | 3/2014 | Patel et al. |
| 2007/0162268 A1 | 7/2007 | Kota et al. |
| 2007/0226287 A1 | 9/2007 | Lin et al. |
| 2008/0279299 A1 | 11/2008 | Reuven et al. |
| 2008/0298478 A1 | 12/2008 | Kim et al. |
| 2009/0232232 A1 | 9/2009 | Duvaut et al. |
| 2009/0232241 A1 | 9/2009 | Shabany et al. |
| 2009/0296842 A1 | 12/2009 | Papadopoulos et al. |
| 2010/0131577 A1* | 5/2010 | Gangalakurti et al. ....... 708/209 |
| 2010/0293210 A1* | 11/2010 | Sima et al. .................... 708/209 |
| 2010/0303176 A1 | 12/2010 | Lilleberg et al. |

(Continued)

OTHER PUBLICATIONS

International Search Report of the International Searching Authority for Application No. PCT/US2010/35989, mailed on Jul. 28, 2010, 1 pages.

(Continued)

*Primary Examiner* — Michael D Yaary
(74) *Attorney, Agent, or Firm* — Kilpatrick Townsend & Stockton LLP

(57) ABSTRACT

A QRD processor for computing input signals in a receiver for wireless communication relies upon a combination of multi-dimensional Givens Rotations, Householder Reflections and conventional two-dimensional (2D) Givens Rotations, for computing the QRD of matrices. The proposed technique integrates the benefits of multi-dimensional annihilation capability of Householder reflections plus the low-complexity nature of the conventional 2D Givens rotations. Such integration increases throughput and reduces the hardware complexity, by first decreasing the number of rotation operations required and then by enabling their parallel execution. A pipelined architecture is presented (290) that uses un-rolled pipelined CORDIC processors (245a to 245d) iteratively to improve throughput and resource utilization, while reducing the gate count.

18 Claims, 15 Drawing Sheets

(56) References Cited

U.S. PATENT DOCUMENTS

| | | |
|---|---|---|
| 2012/0134451 A1 | 5/2012 | Patel et al. |
| 2012/0269303 A1 | 10/2012 | Paker et al. |
| 2015/0016557 A1 | 1/2015 | Patel et al. |

OTHER PUBLICATIONS

Written Opinion of the International Searching Authority for Application No. PCT/US2010/35989, mailed on Jul. 28, 2010, 7 pages.

Andraka, "A survey of CORDIC algorithms for FPGA based computers," Proc. of the 1998 ACM/SIGDA sixth international symposium on Field Programmable Gate Arrays, Feb. 1998, 10 pages.

Boleng, et al., "Load balanced parallel QR decomposition on Shared Memory Multiprocessors," Parallel Computing, Sep. 2001, vol. 27, pp. 1321-1345.

Davis, "Scaled and decoupled Cholesky and QR decompositions with application to spherical MIMO detection," in Proc. of WCNC, 2003, vol. 1, pp. 326-331.

Delosme, et al., "CORDIC algorithms in Four Dimensions," Advanced Signal Processing Algorithms, Architectures, and Implementations, Proc. SPIE, Jul. 1990, vol. 1348, No. 1, pp. 349-360.

El-Amawy, et al., "Parallel VLSI algorithm for Scalable Inversion of Dense Matrices," Computers and Digital Techniques, IEEE Proceedings, Nov. 1989, vol. 136, No. 6, pp. 575-580.

Golub, et al., Matrix Computations, 3rd ed. Baltimore, MD: John Hopkins University Press, 1996, pp. 1-240.

Golub, et al., Matrix Computations, 3rd ed. Baltimore, MD: John Hopkins University Press, 1996, pp. 241-480.

Golub, et al., Matrix Computations, 3rd ed. Baltimore, MD: John Hopkins University Press, 1996, pp. 481-694.

Hsiao, et al., "Householder CORDIC Algorithms," IEEE Transactions on Computers, Aug. 1995, vol. 44, No. 8, pp. 990-1001.

Hwang, et al., "A Low Complexity Complex QR Factorization Design for Signal Detection in MIMO OFDM Systems," in Proc. IEEE ISCAS 2008, May 2008, pp. 932-935.

Lai, et al., "A Modified Sorted-QR Decomposition Algorithm for Parallel Processing in MIMO Detection," Proc. IEEE ISCAS 2009, May 2009, pp. 1405-1408.

Maltsev, et al., "Triangular Systolic Array with Reduced Latency for QR-decomposition of Complex Matrices," in Proc. IEEE ISCAS 2006, May 2006, pp. 385-388.

Patel et al., "How to migrate HDL Design to ATE Test Plan Quickly and Efficiently the V93K-Test Generator Tool," CMC application note, Jun. 27, 2008, 10 pages.

Salmela, et al., "Complex-valued QR decomposition implementation for MIMO receivers," in Proc. IEEE ICASSP 2008, Apr. 2008, pp. 1433-1436.

Shabany, et al., "A 0.13um CMOS 655Mb/s 4x4 64-QAM K-Best MIMO detector," Proc. IEEE Int. Solid-State Circuits Conf., 2009, pp. 256-258.

Shabany, et al., "Scalable VLSI Architecture for K-Best Lattice Decoders," in Proc. IEEE ISCAS 2008, May 2008, pp. 940-943.

Singh, et al., "VLSI Architecture for Matrix Inversion using Modified Gram-Schmidt based QR Decomposition," International Conference on VLSI Design, Jan. 2007, pp. 836-841.

Sobhanmanesh, et al., "Parametric minimum hardware QR-factoriser Architecture for V-BLAST Detection," in IEEE Proceedings on Circuits, Devices and Systems, Oct. 2006, vol. 153, No. 5, pp. 433-441.

Volder, "The CORDIC Trigonometric Computing Technique," in IRE Trans. Electronic Computers, Sep. 1959, vol. 8, No. 3, pp. 330-334.

Walther, "A Unified Algorithm for Elementary Functions," in Proc. AFIPS Spring Joint Computing Conf., Nov. 1971, vol. 38, pp. 379-385.

Wang, et al., "A Unified View of CORDIC Processor Design," in Proc. of IEEE 39th Midwest Symposium on Circuits and Systems, Aug. 1996, vol. 2, pp. 852-855.

International Search Report and Written Opinion for Application No. PCT/US2011/038642, mailed on Oct. 11, 2011, 12 pages.

Non-Final Office Action for U.S. Appl. No. 13/149,743 mailed on Apr. 4, 2013, 17 pages.

International Preliminary Report on Patentability for PCT Application No. PCT/US2010/035989, mailed Dec. 1, 2011, 9 pgs.

International Preliminary Report on Patentability for PCT Application No. PCT/2011/038642, mailed Dec. 13, 2012, 7 pgs.

\* cited by examiner $$\begin{bmatrix} H^{Re}_{1,1} & -H^{Im}_{1,1} & H^{Re}_{1,2} & -H^{Im}_{1,2} & H^{Re}_{1,3} & -H^{Im}_{1,3} & H^{Re}_{1,4} & -H^{Im}_{1,4} & | & y^{Re}_{1,1} & \cdots & y^{Re}_{1,4} \\ H^{Im}_{1,1} & H^{Re}_{1,1} & H^{Im}_{1,2} & H^{Re}_{1,2} & H^{Im}_{1,3} & H^{Re}_{1,3} & H^{Im}_{1,4} & H^{Re}_{1,4} & | & y^{Im}_{1,1} & & y^{Im}_{1,4} \\ \hline H^{Re}_{2,1} & -H^{Im}_{2,1} & H^{Re}_{2,2} & -H^{Im}_{2,2} & H^{Re}_{2,3} & -H^{Im}_{2,3} & H^{Re}_{2,4} & -H^{Im}_{2,4} & | & y^{Re}_{2,1} & \cdots & y^{Re}_{2,4} \\ H^{Im}_{2,1} & H^{Re}_{2,1} & H^{Im}_{2,2} & H^{Re}_{2,2} & H^{Im}_{2,3} & H^{Re}_{2,3} & H^{Im}_{2,4} & H^{Re}_{2,4} & | & y^{Im}_{2,1} & & y^{Im}_{2,4} \\ \hline H^{Re}_{3,1} & -H^{Im}_{3,1} & H^{Re}_{3,2} & -H^{Im}_{3,2} & H^{Re}_{3,3} & -H^{Im}_{3,3} & H^{Re}_{3,4} & -H^{Im}_{3,4} & | & y^{Re}_{3,1} & \cdots & y^{Re}_{3,4} \\ H^{Im}_{3,1} & H^{Re}_{3,1} & H^{Im}_{3,2} & H^{Re}_{3,2} & H^{Im}_{3,3} & H^{Re}_{3,3} & H^{Im}_{3,4} & H^{Re}_{3,4} & | & y^{Im}_{3,1} & & y^{Im}_{3,4} \\ \hline H^{Re}_{4,1} & -H^{Im}_{4,1} & H^{Re}_{4,2} & -H^{Im}_{4,2} & H^{Re}_{4,3} & -H^{Im}_{4,3} & H^{Re}_{4,4} & -H^{Im}_{4,4} & | & y^{Re}_{4,1} & \cdots & y^{Re}_{4,4} \\ H^{Im}_{4,1} & H^{Re}_{4,1} & H^{Im}_{4,2} & H^{Re}_{4,2} & H^{Im}_{4,3} & H^{Re}_{4,3} & H^{Im}_{4,4} & H^{Re}_{4,4} & | & y^{Im}_{4,1} & & y^{Im}_{4,4} \end{bmatrix}$$

*FIG. 5*

$$\begin{bmatrix} H^{Re}_{1,1} & -H^{Im}_{1,1} & H^{Re}_{1,2} & -H^{Im}_{1,2} & H^{Re}_{1,3} & -H^{Im}_{1,3} & H^{Re}_{1,4} & -H^{Im}_{1,4} & | & y^{Re}_{1,1} & \cdots & y^{Re}_{1,4} \\ H^{Im}_{1,1} & H^{Re}_{1,1} & H^{Im}_{1,2} & H^{Re}_{1,2} & H^{Im}_{1,3} & H^{Re}_{1,3} & H^{Im}_{1,4} & H^{Re}_{1,4} & | & y^{Im}_{1,1} & & y^{Im}_{1,4} \\ \hline H^{Re}_{2,1} & -H^{Im}_{2,1} & H^{Re}_{2,2} & -H^{Im}_{2,2} & H^{Re}_{2,3} & -H^{Im}_{2,3} & H^{Re}_{2,4} & -H^{Im}_{2,4} & | & y^{Re}_{2,1} & \cdots & y^{Re}_{2,4} \\ H^{Im}_{2,1} & H^{Re}_{2,1} & H^{Im}_{2,2} & H^{Re}_{2,2} & H^{Im}_{2,3} & H^{Re}_{2,3} & H^{Im}_{2,4} & H^{Re}_{2,4} & | & y^{Im}_{2,1} & & y^{Im}_{2,4} \\ \hline H^{Re}_{3,1} & -H^{Im}_{3,1} & H^{Re}_{3,2} & -H^{Im}_{3,2} & H^{Re}_{3,3} & -H^{Im}_{3,3} & H^{Re}_{3,4} & -H^{Im}_{3,4} & | & y^{Re}_{3,1} & \cdots & y^{Re}_{3,4} \\ H^{Im}_{3,1} & H^{Re}_{3,1} & H^{Im}_{3,2} & H^{Re}_{3,2} & H^{Im}_{3,3} & H^{Re}_{3,3} & H^{Im}_{3,4} & H^{Re}_{3,4} & | & y^{Im}_{3,1} & & y^{Im}_{3,4} \\ \hline H^{Re}_{4,1} & -H^{Im}_{4,1} & H^{Re}_{4,2} & -H^{Im}_{4,2} & H^{Re}_{4,3} & -H^{Im}_{4,3} & H^{Re}_{4,4} & -H^{Im}_{4,4} & | & y^{Re}_{4,1} & \cdots & y^{Re}_{4,4} \\ H^{Im}_{4,1} & H^{Re}_{4,1} & H^{Im}_{4,2} & H^{Re}_{4,2} & H^{Im}_{4,3} & H^{Re}_{4,3} & H^{Im}_{4,4} & H^{Re}_{4,4} & | & y^{Im}_{4,1} & & y^{Im}_{4,4} \end{bmatrix}$$

*FIG. 6*

SIGNAL PROCESSING BLOCK FOR A RECEIVER IN WIRELESS COMMUNICATION

CROSS-REFERENCES TO RELATED APPLICATIONS

The present application claims benefit under 35 USC §119 (e) of U.S. Application No. 61/180,536 filed May 22, 2009, entitled "Signal Processing Block for a Receiver in Wireless Communication" by Dimpesh Patel, Glenn Gulak, and Mandi Shabany, the content of which is incorporated herein by reference in its entirety.

The following publications provide additional technical information in connection with the present application:

"VLSI Architecture for Matrix Inversion using Modified Gram-Schmidt based QR Decomposition," International Conference on VLSI Design, pp. 836-841, January 2007, C. Singh, S. Prasad, and P. Balsara;

"Complex-valued QR decomposition implementation for MIMO receivers," in Proc. IEEEICASSP 2008, pp. 1433-1436, April 2008, P. Salmela, A. Burian, H. Sorokin, and J. Takala;

"A Low Complexity Complex QR Factorization Design for Signal Detection in MIMO OFDM Systems," in Proc. IEEE ISCAS 2008, pp. 932-935, May 2008, Y. T. Hwang and W. D. Chen;

"Scalable VLSI Architecture for K-Best Lattice Decoders," in Proc. IEEE ISCAS 2008, pp. 940-943, May 2008, M. Shabany and P. G. Gulak;

"CORDIC algorithms in four dimensions," Advanced Signal Processing Algorithms, Architectures, and Implementations, Proc. SPIE, vol. 1348, no. 1, pp. 349-360, July 1990, J. Delosme and S. Hsiao;

"Householder CORDIC Algorithms," IEEE Transactions on Computers, vol. 44, no. 8, pp. 990-1001, August 1995, S. Hsiao and J. Delosme "Load balanced parallel QR decomposition on Shared Memory Multiprocessors," Parallel Computing, vol. 27, pp. 1321-1345, September 2001, J. Boleng and M. Misra;

"A 0.13 um CMOS 655 Mb/s 4×4 64-QAM K-Best MIMO detector," Proc. IEEE Int. Solid-State Circuits Conf., pp. 256-257, 2009, M. Shabany and P. G. Gulak;

"Scalable VLSI Architecture for K-Best Lattice Decoders," Proc. IEEE Int. Symp. Circuits Syst., pp. 940-943, 2008, M. Shabany and P. G. Gulak;

"Scaled and decoupled Cholesky and QR decompositions with application to spherical MIMO detection," in Proc. of WCNC, vol. 1, pp. 326-331, 2003, L. Davis;

Matrix Computations, 3$^{rd}$ ed. Baltimore, Md.: John Hopkins University Press, 1996, G. H. Golub and C. F. V. Loan;

"VLSI Architecture for Matrix Inversion using Modified Gram-Schmidt based QR Decomposition," International Conference on VLSI Design, pp. 836-841, January 2007, C. Singh, S. Prasad, and P. Balsara;

"Complex-valued QR decomposition implementation for MIMO receivers," in Proc. IEEE ICASSP 2008, pp. 1433-1436, April 2008, P. Salmela, A. Burian, H. Sorokin, and J. Tanaka;

"A survey of CORDIC algorithms for FPGA based computers," Proc. of the 1998 ACM/SIGDA sixth international symposium on Field Programmable Gate Arrays, pp. 191-200, February 1998, R. Andraka;

"VLSI Implementation of a High-Speed Iterative Sorted MMSE QR Decomposition," in IRE Trans. Electronic Computers, vol. 8, no. 3, pp. 330-334, September 1959, J. Voider;

"A Unified Algorithm for Elementary Functions," in Proc. AFIPS Spring Joint Computing Conf., vol. 38, pp. 379-385, November 1971, J. Voider;

"CORDIC algorithms in Four Dimensions," Advanced Signal Processing Algorithms, Architectures, and Implementations, Proc. SPIE, vol. 1348, no. 1, pp. 349-360, July 1990, J. Delosme and S. Hsiao;

"Householder CORDIC Algorithms," IEEE Transactions on Computers, vol. 44, no. 8, pp. 990-1001, August 1995, J. Delosme and S. Hsiao;

"Parallel VLSI algorithm for Scalable Inversion of Dense Matrices," Computers and Digital Techniques, IEEE Proceedings, vol. 136, no. 6, pp. 575-580, November 1989, A. El-Amawy and K. R. Dharmarajan;

"A Low Complexity QR Factorization Design for Signal Detection in MIMO OFDM Systems," in Proc. IEEE ISCAS 2008, pp. 932-935, May 2008, Y. T. Hwang and W. D. Chen;

"Triangular Systolic Array with Reduced Latency for QR-decomposition of Complex Matrices," in Proc. IEEE ISCAS 2006, pp. 1421-1424, May 2006, A. Maltsev, V. Pestretsov, R. Maslennikov, and A. Khoryaev;

"Parametric minimum hardware QR-factoriser Architecture for V-BLAST Detection," in IEEE Proceedings on Circuits, Devices and Systems, vol. 153, no. 5, pp. 433-441, October 2006, F. Sobhanmanesh and S. Nooshabadi;

"A Unified View of CORDIC Processor Design," in Proc. of IEEE 39$^{th}$ Midwest Symposium on Circuits and Systems, vol. 2, pp. 852-855, August 1996, S. Wang, V. Piuri, and E. S. Jr., "How to migrate HDL Design to ATE Test Plan Quickly and Efficiently the V93K-Test Generator Tool," CMC application note, October, 2008, D. Patel;

"A Modified Sorted-QR Decomposition Algorithm for Parallel Processing in MIMO Detection," Proc. IEEE ISCAS 2009, pp. 1405-1408, May 2009, R. H. Lai, C. M. Chen, P. Ting, and Y. H. Huang.

The present application incorporates herein by reference the entire contents of all of the above publications.

BACKGROUND OF THE INVENTION

The present invention relates to an improved signal processing block and more particularly to a processor block for computing QR decomposition of a Channel Matrix for detection/estimation of incoming signals in, for example, a MIMO receiver for communication.

Due to its capability of providing high spectral efficiency and link reliability, multiple-input multiple-output (MIMO) technology has become a key part in many new wireless communication standards, the technology using multiple antennas at both the transmitter and receiver to improve communication performance. However, one of the implementation challenges for MIMO systems is to develop high-throughput low-complexity MIMO receivers and related signal processing blocks.

QR decomposition (QRD) is an essential signal processing task that is utilized in most MIMO detection schemes to decompose an estimated channel matrix into an upper triangular matrix, providing a suitable framework for sequential detection schemes. However, decomposition of complex MIMO channel matrices with large dimensions leads to high computational complexity and hence results in either large core area or low throughput. Moreover, for mobile communication applications that involve fast-varying channels, it is required to perform QRD with low processing latency.

There are several methods for computing the QRD, such as by means of the Modified Gram-Schmidt Ortho-normalization (MGS) algorithm, Householder reflections and Givens rotations. Each has a number of advantages and disadvantages.

Straightforward implementations of the MGS process and Householder reflections require multiplication, division and square-root operations, resulting in a high hardware complexity and computation latency. For MGS, C. Singh, S. Prasad, and P. Balsara, in "VLSI Architecture for Matrix Inversion using Modified Gram-Schmidt based QR Decomposition," International Conference on VLSI Design, pp. 836-841, January 2007, propose using log-domain computations to implement these operations using low-complexity adders, subtractors and shifters. However, the solution presented performs frequent data conversions between log and linear domains and it requires large storage space to hold the necessary look-up tables. Large amounts of storage increase either the die area of the solution and hence the cost. In "Complex-valued QR decomposition implementation for MIMO receivers," in Proc. IEEEICASSP 2008, pp. 1433-1436, April 2008, P. Salmela, A. Burian, H. Sorokin, and J. Takala, propose a low-complexity approximation to implement the inverse square-root function. However, due to the underlying approximation, it might lead to bit error rate (BER) performance degradation, especially for fixed precision arithmetic. Householder reflections have the mathematical advantage of nulling multiple rows simultaneously. However, this benefit comes with a challenging implementation issue when trying to carry out multiple reflections in parallel.

Since Givens rotations work on only two matrix rows at a time, they are more easily parallelized. Furthermore, the Coordinate Rotation Digital Computer (CORDIC) solution, in its vectoring and rotation modes, is usable to perform Givens rotations using low-complexity shift and add operations. These two factors make Givens rotations the method of choice for common QRD implementations with small dimensionality. However, using the conventional sequence of Givens rotations to decompose matrices with large dimensions leads to high computational complexity, due to the large number of required vectoring and rotation operations. To alleviate this problem, a modified sequence of Givens rotations is presented by Y. T. Hwang and W. D. Chen in "A Low Complexity Complex QR Factorization Design for Signal Detection in MIMO OFDM Systems," in Proc. IEEE ISCAS 2008, pp. 932-935, May 2008 that keeps the block-wise symmetry between the sub matrices intact during the annihilation process. However, this improved sequence still leads to a large number of rotation operations for high-dimensional MIMO systems (e.g., 4×4). Furthermore, the sequential nature of element annihilations for certain sub-matrices and the large number of required rotations for each annihilation causes a throughput bottleneck.

BRIEF SUMMARY OF THE INVENTION

In an embodiment of the present invention, a device comprises a QR Decomposition (QRD) processing unit that includes an input port for receiving an input matrix having a plurality of real value elements and a processor operative to concurrently annihilate a portion of the plurality of real elements. The processor is configured to perform multi-dimensional Givens Rotations, multi-dimensional Householder Reflections, and two-dimensional (2D) Givens Rotations, multi-dimensional Householder Reflections to generate a QRD of the input matrix within a computational time. The processor further includes an output port for providing data relating to the QRD of the input matrix. In addition, the processor includes a circuitry to generate z vectors with a same time period as the QRD computational time. Further, the input port is coupled with a multiple-input multiple-output receiver having multiple antennas.

In an embodiment of the present invention, a method for computing QR decomposition includes receiving a data matrix relating to a received signal that is received at a plurality of antennas. The data matrix includes a plurality of real value elements. The method further includes concurrently annihilating a portion of the plurality of real value elements using a combination of multi-dimensional Givens Rotations, multi-dimensional Householder Reflections and conventional 2D Givens Rotations; computing the QR decomposition (QRD) of the matrix; and outputting data related to the QRD of the matrix. Additionally, the method includes approximating multiple two-dimensional Givens Rotations in parallel to either nullify multiple elements within a multi-dimensional vector or to rotate multi-dimensional vector by given angles, by use of multi-dimensional CORDIC algorithms and multi-dimensional Householder CORDIC algorithms. Furthermore, the method includes obtaining a strictly upper-triangular real R matrix by using a modified Real Value Decomposition (RVD) model. The method further includes performing multi-dimensional vector rotations by using only shift and add operations. In certain embodiments, the plurality of antennas include 2 or more antennas. In other embodiments, the plurality of antennas include at least 4 antennas.

In another embodiment of the present invention, a method includes operating with pipelined stages of an input controller for interfacing a QRD core with a preceding stage in the receiver and an output controller for interfacing the QRD core with a succeeding stage in the receiver, the input controller is configured to read in the input matrix and the output controller is configured to write out an output matrix. The method further includes operating with four pipelined central stages to compute the QRD of the input matrix and 4 z vectors, using un-rolled pipelined 2D, 3D and 4D CORDIC processors. Additionally, the method includes operating with a multiplexer bank with datapath of each stage for selecting input operands for the CORDIC processor every cycle, and operating with a register bank for each central stage, for re-directing and holding the CORDIC outputs until the current central stage completes its desired computations.

In yet another embodiment of the present invention, a method includes forming the 3D un-rolled CORDIC processors with 4 pipelined stages; implementing 2 sets of conventional 2D CORDIC elementary rotations in a single clock cycle for each stage, implementing one set of CORDIC equations in each half of the clock cycle by using a same set of 16-bit signed adders twice and using multiplexers to select input values to these adders, performing four 2D vectoring and twenty four 2D rotation operations within 40 clock cycles, in Stage1 of the 2D CORDIC processor; performing three 2D vectoring and twenty four 2D rotation operations within 40 clock cycles, in Stage4 of the 2D processor; implementing two sets of Householder 3D CORDIC elementary rotation processes within two clock cycles, for each stage of the 3D un-rolled CORDIC processor; performing one 3D vectoring and twelve 3D rotation operations within 40 clock cycles, in Stage3 of the un-rolled 3D CORDIC processor; configuring the 4D/2D configurable un-rolled CORDIC processor in Stage 2, such that the 4D/2D processor comprises 8 pipelined stages, each of which is programmable to operate in either 4D or 2D mode; implementing 2 sets of 2D elementary CORDIC processes in the 2D mode of operation and implementing 1 set of 4D CORDIC elementary rotation equations in the 4D mode of operation for each stage; and performing a total of one 4D vectoring, fourteen 4D rotation, three 2D vectoring and eighteen 2D rotation operations within 36 clock cycles, by the 4D/2D configurable CORDIC processor.

BRIEF DESCRIPTION OF THE DRAWINGS

In the following drawings, emphasis is placed upon illustrating the principles of the invention. The various embodiments and advantages of the present invention will be more fully understood when considered with respect to the following detailed description, appended claims and accompanying drawings wherein:

FIG. 5 illustrates an Element Annihilation Sequence using Givens Rotations QRD scheme, as known in the prior art.

FIG. 6 illustrates an Element Annihilation Sequence, in accordance with one embodiment of the present invention.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Before describing in detail embodiments that are in accordance with the present invention, it should be noted that the figures are for ease of explanation of the basic teachings of the present invention only. The figures being block diagrams or circuit diagrams provide only the concept of the preferred embodiment of the invention. Further, the exact circuit designs and the specifications of the passive and active devices for each of the functions described in the embodiments will be within the skill of the art after the following teachings of the present invention have been read and understood. The figures are represented by symbols and nomenclature that are standard in the industry.

Figures 1, 3:
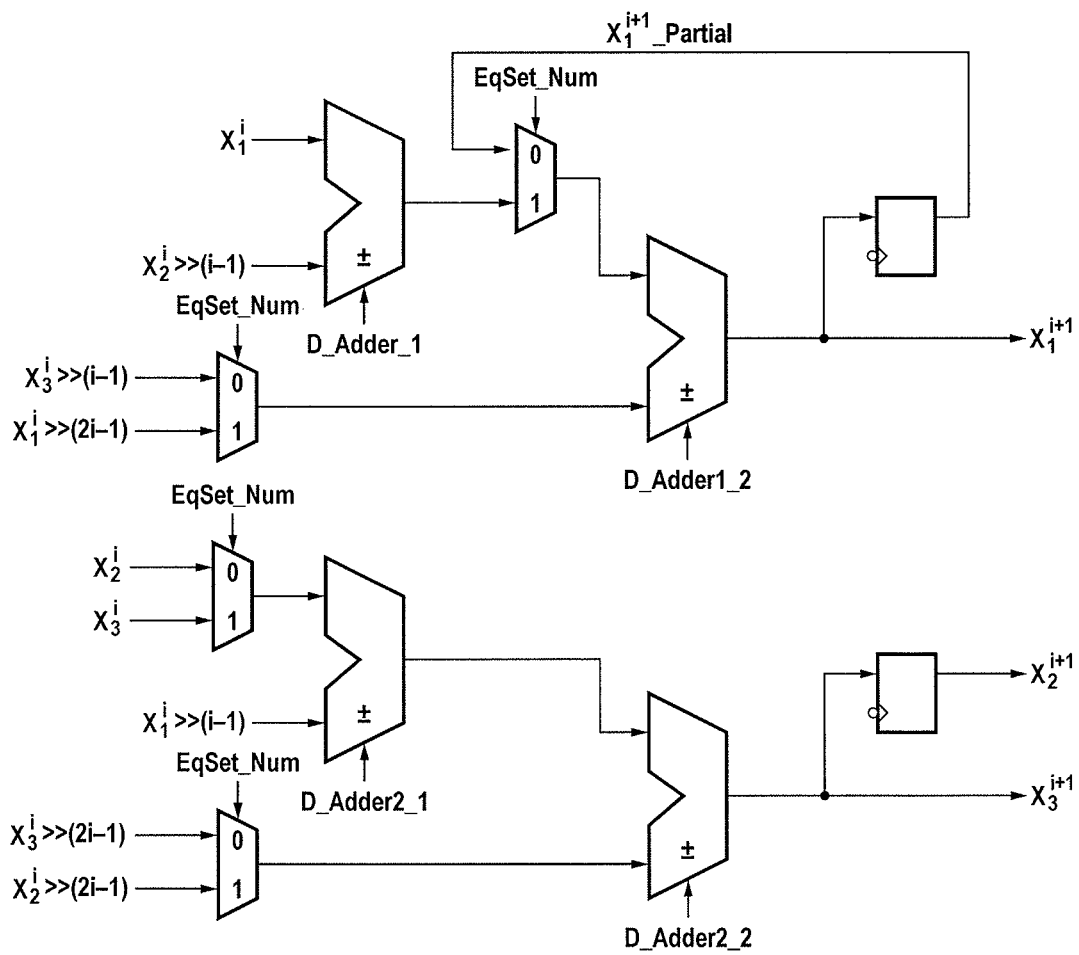
FIG. 1 illustrates a modified Real-valued H Matrix augmented with four Received Vectors and the element nullification sequence with conventional Givens rotations QRD, according to an embodiment of the invention.
FIG. 3 illustrates a simplified schematic diagram of a single stage architecture for the Householder 3D CORDIC Processor, according to an embodiment of the invention.

For illustration, following is a discussion of a conventional MIMO system with $N_T$ transmit and $N_R$ receive antennas. The complex baseband equivalent model for this system can be given as $\sim y = \sim H \sim s + \sim v$, where $\sim s$ and $\sim y$ denote the complex transmitted and received symbol vectors, respectively. The $N_R$-dimensional vector $\sim v$ is an independent identically distributed (i.i.d) complex zero-mean Gaussian noise vector with variance $\sigma^2$. The matrix $\sim H$ represents an $N_R \times N_T$ complex-valued channel matrix. The real-valued system model is derivable using the real valued decomposition (RVD) process as described in M. Shabany and P. G. Gulak, "Scalable VLSI Architecture for K-Best Lattice Decoders," in Proc. IEEE ISCAS 2008, pp. 940-943, May 2008, and can be expressed as $y = Hs + v$, where the dimensions of s, y and H are $2N_T \times 1$, $2N_R \times 1$ and $2N_R \times 2N_T$, respectively. The QRD using the conventional RVD model produces 4 upper triangular sub-matrices. However, if a modified RVD model shown in FIG. 1 is used, then a strictly upper-triangular 8×8 R matrix is attainable. In FIG. 1, denote $H_{i,j}^{Re}$ and $H_{i,j}^{Im}$ the real and imaginary parts of the complex elements, respectively. Many of the MIMO detection processes begin the estimation process of the transmitted symbol vector by decomposing the channel matrix H into a unitary Q matrix and an upper-triangular R matrix. Performing nulling operation on the received signal by $Q^H$ results in the updated system equation: $z = Q^H y = Rs + Q^H v$. Thus the QRD core computes and provides matrix R and updates symbol vector $z = Q^H y$ to the MIMO detector.

In an embodiment, a QRD core is designed to be used with the K-Best 4×4 MIMO detector presented by M. Shabany and P. G. Gulak, in "Scalable VLSI Architecture for K-Best Lattice Decoders," in Proc. IEEE ISCAS 2008, pp. 940-943, May 2008 with K=10, and hence its performance specifications are derived as follows. The K-Best detector receives a new input z vector every K=10 clock cycles and assumes that the channel is quasi-static and, is updated every four channel use. Hence, the QRD core should be designed to generate a new 8×8 real R matrix and four 8×1 real z vectors every 40 clock cycles, while optionally minimizing power dissipation and gate count for an exemplary application of mobile communications. In an embodiment, the QRD core may operate at a clock frequency of at least 270 MHz. Without loss of generality, this is an example. The QRD scheme is applicable and necessary to many other types of detection schemes, such as sphere decoding, etc.

As discussed earlier, among the basic methods for QRD computation, the Givens rotations method is superior in terms of performance and hardware complexity for small dimensionality. However, QRD of a large H matrix using conventional sequence of Givens rotations relies on a large number of vectoring and rotations operations, e.g. for a 4×4 complex matrix, a total of 28 vectoring and 252 rotation operations are used. The modified sequence of Givens rotations presented by Y. T. Hwang and W. D. Chen reduces the number of vectoring and rotation operations to 16 and 136, respectively, which is still large.

Another issue with using the existing sequences of Givens rotations for QRD is the sequential nature of element annihilations for certain sub-matrices. For example, from the nullification sequence shown in FIG. 1 for the first two columns of H matrix, annihilations of the $H_{4,1}^{Re}$, $H_{3,1}^{Re}$ and $H_{2,1}^{Re}$ elements and their corresponding rotations are performed sequentially using appropriate pivot elements, since they use common sets of rows. These issues with the existing sequences of Givens rotations lead to larger latency, hence lower data throughput, or, to support a pre-specified data rate a higher frequency and higher hardware complexity for QRD implementation.

According to an embodiment of the present invention, a hybrid QRD processing core uses a combination of multi-dimensional Givens rotations, Householder reflections and conventional two dimensional Givens rotations in order to reduce, over prior art implementations, the number of rotation operations performed and to enable a parallel implementation. The process increases throughput by annihilating multiple $H_*^{Re}$ elements simultaneously, where Re is the real part of the complex element and * represents the indices in the matrix. The annihilating is achieved by using multi-dimensional Givens rotations and Householder reflections and reduces the overall circuit complexity by implementing these multi dimensional rotations using series of shift and add operations. Multi-dimensional Givens rotations operate on vectors of dimensions larger than 2, to align them with the first axis. A generic way to implement multi-dimensional Givens rotations is to use high-complexity multiply-and-add based processes. However, J. Delosme and S. Hsiao in "CORDIC algorithms in four dimensions," Advanced Signal Processing Algorithms, Architectures, and Implementations, Proc. SPIE, vol. 1348, no. 1, pp. 349-360, July 1990 present 3D and 4D CORDIC processes as an extension of the conventional 2D CORDIC process, using low-complexity shift and add operations to carry out Givens rotations for 3D and 4D vectors. Householder reflections also provide the capability of introducing multiple zeroes simultaneously. In "Householder CORDIC Algorithms," IEEE Transactions on Computers, vol. 44, no. 8, pp. 990-1001, August 1995, S. Hsiao and J. Delosme propose a novel Householder CORDIC process, that performs 3D and 4D vector rotations based on a sequence of simple Householder reflections using shift, carry-save-addition (CSA) and addition operations. The elementary rotation equations for the Householder 3D CORDIC process and 4D CORDIC process are described in J. Delosme and S. Hsiao, "CORDIC algorithms in four dimensions," Advanced Signal Processing Algorithms, Architectures, and Implementations, Proc. SPIE, vol. 1348, no. 1, pp. 349-360, July 1990 and S. Hsiao and J. Delosme, "Householder CORDIC Algorithms," IEEE Transactions on Computers, vol. 44, no. 8, pp. 990-1001, August 1995.

An embodiment of the present invention uses a special sequence of Givens rotations that maintains symmetry between adjacent columns of H intact as explained in Y. T. Hwang and W. D. Chen, "A Low Complexity Complex QR Factorization Design for Signal Detection in MIMO OFDM Systems," in Proc. IEEE ISCAS 2008, pp. 932-935, May 2008. Hence, the process only performs vectoring and rotation operations on odd numbered columns of H and the values for the elements in the even numbered columns can be derived automatically, without any computations.

Though the scheme is described here for QRD of a 4×4 complex matrix, it can be generalized to any matrix dimensions by appropriately using 2D, 3D and 4D Givens rotations and Householder reflections. The multi-dimensional CORDIC process and the Householder CORDIC process; along with simplified and efficient 2D, 3D and 4D CORDIC VLSI architectures, are used to develop a high-throughput low complexity architecture for QRD for large matrix dimensions.

The process begins with annihilating the $H_*^{Im}$ elements in the first column of the H matrix in a parallel manner using conventional 2D Givens rotations. It then uses 4D Givens rotations to annihilate the elements $H_{4,1}^{Re}$, $H_{3,1}^{Re}$ and $H_{2,1}^{Re}$ in parallel, as opposed to the sequential annihilation using the conventional 2D Givens rotations. As a result, a number of corresponding rotation operations is reduced by a factor of 3, from 42 to 14. Then, conventional 2D Givens rotations are used once again to perform parallel annihilation of the $H_*^{Im}$ elements in the third column of the H matrix, shown in FIG. 1. The proposed process then uses the 3D Householder CORDIC process to annihilate $H_{4,2}^{Re}$, $H_{3,2}^{Re}$ simultaneously. The effect of element annihilation is propagated to non-zero elements in rows 2, 3, 4 and 6, 7, 8 in parallel, and this further reduces the number of corresponding rotation operations by a factor of 2. Finally, the $H_{3,3}^{Im}$, $H_{4,3}^{Im}$, $H_{4,3}^{Re}$ and $H_{4,4}^{Im}$ elements are annihilated in the order given here, using conventional 2D Givens rotations.

The improved QRD process is used to develop a QRD architecture for 4×4 MIMO receivers. The QRD core outputs an 8×8 R matrix and four 8×1 z vectors every 40 clock cycles. During the QR Decomposition process, 2D, 3D and 4D vector rotations are applied to the elements of the input H matrix to convert it to an upper-triangular R matrix. As shown earlier, since $z=Q^H y$, application of these same 2D, 3D and 4D vector rotations to the input received symbol vectors, y, will transform them to z vectors at the end of the QR Decomposition process. Optionally, the updated symbol vectors, z, are generated simultaneously while converting the input H matrix to the output R matrix. This obviates calculation of an inverse matrix in order to determine z.

Figure 2:
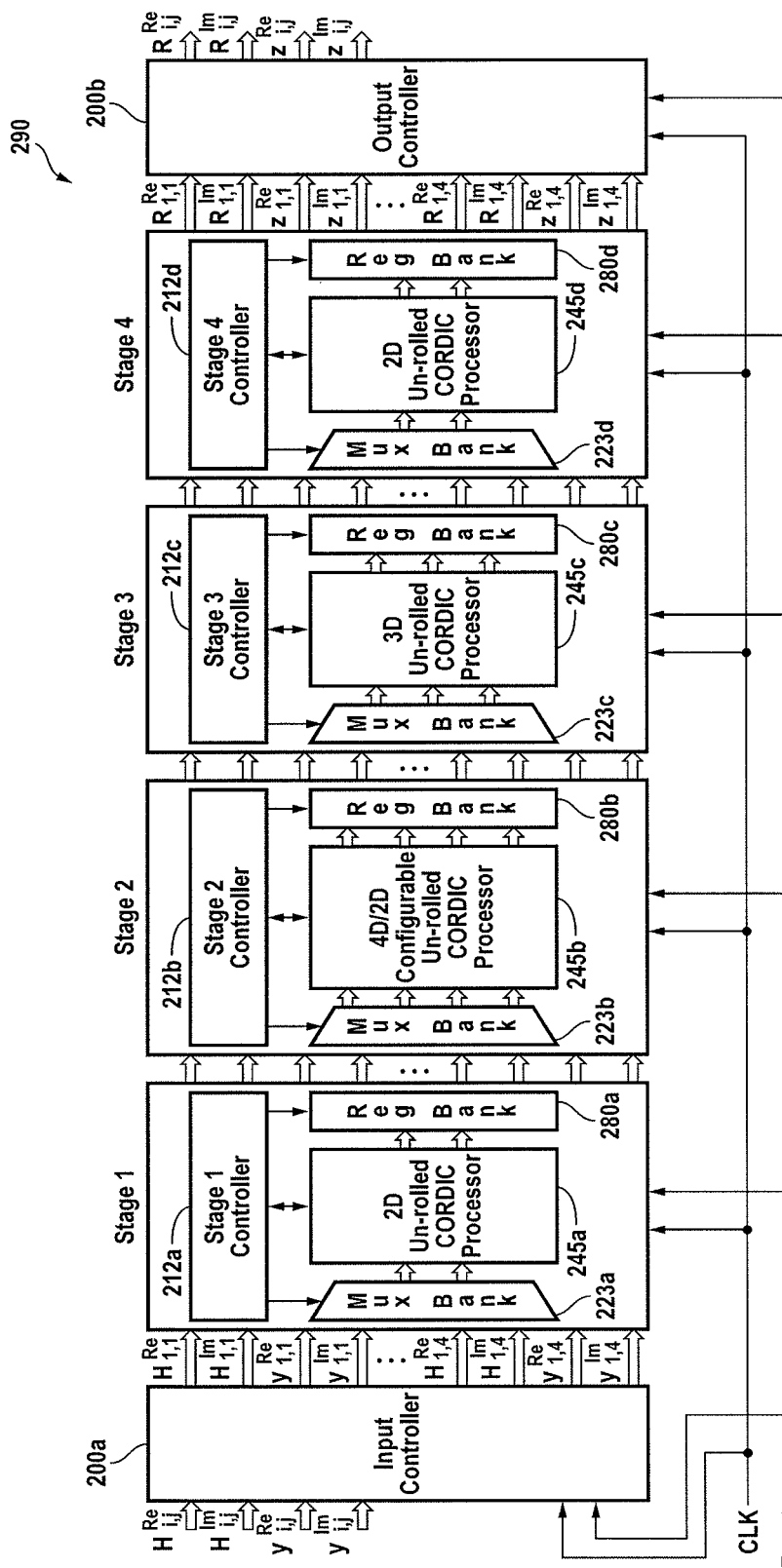
FIG. 2 illustrates a schematic view of the overall QRD algorithm core architecture, according to an embodiment of the invention.

An implementation according to an embodiment comprises a novel pipelined architecture that uses un-rolled CORDIC processors, iteratively, to implement the proposed QRD process. The overall QRD architecture with the improved QRD process is illustrated in FIG. 2 wherein a simplified diagram of a QRD architecture for 4×4 MIMO receivers is shown. The QRD core performs a total of 16 vectoring and 136 rotation operations to output an 8×8 R matrix and four 8×1 z vectors every 40 clock cycles.

FIG. 2 shows a pipelined architecture (290) using un-rolled CORDIC processors (245a to 245d) iteratively to implement the proposed QRD process. The overall architecture comprises 6 pipelined stages. The Input Controller and Output Controller stages (200a, 200b) provide interfaces for the QRD core to the preceding and succeeding stages in a MIMO receiver, to read in or write out the input and output matrices. In an embodiment, input controller 200a receives an input complex matrix and complex y vectors every 40 clock cycles from the preceding stage in the MIMO receiver. In an embodiment, the input complex matrix includes a 4×4 complex H matrix and the complex y vectors comprises four 4×1 complex y vectors. Input controller 200a then stores the received data and uses them to provide appropriate input operands to the CORDIC processors in a subsequent stage. In an embodiment, input controller 200a includes an input coarse rotation. Input controller 200a, based on the input operands, generates a control signal that is used by output controller 200b to determine whether or not to perform an inverse rotation. At each of the four central stages, Stage1-4, a QR decomposition of input H matrix, as well as 4 z vectors using un-rolled pipelined 2D, 3D and 4D CORDIC processors is computed. The datapath of each of these stages also contains a multiplexer bank (223a to 223d), that is used to select the input operands for the CORDIC processor every cycle, and a register bank (280a to 280d) that is used to re-direct and hold the CORDIC output ports until the current stage completes its computations. Each of these stages also comprises an independent Stage Controller (212a to 212d) that provides control signals to direct appropriate data in and out of the CORDIC processor every cycle. The stage controller also controls the CORDIC mode of operation, the rotation direction transfers and re-use of the pipelined CORDIC stages in order to Maximize resource utilization. The CORDIC modules were designed to approximately minimize gate count by performing CORDIC process iterations in each half of the clock cycle, however the Stage Controllers are designed to use full clock cycles for reduced complexity. In an embodiment, 2 sets of 2D CORDIC elementary rotation equations may be computed in the same single stage. For example, the same set of 16-bit signed adders can be used twice having a input multiplexer to select inputs to the set of adders, with the clock signal acts as the multiplex select control signal. In the first half of the clock cycle, the inputs corresponding to the first set of elementary equations are passed to the adders. The adder outputs, from the first half of the clock cycle processing, are used as the adder inputs for the second half of the clock cycle. Thus, the present embodiment meets the QRD processing latency specification of 40 cycles, while improving resource utilization and gate count. In an embodiment, the last stage of the 2D CORDIC processor, Householder 3D processor and 4D/2D configurable CORDIC processor may include a mechanism to compensate for implicit CORDIC processing gain. In order to reduce area and power requirements, as well as the length of critical path, the compensation of the CORDIC processing gain is approximating using bit shift and addition, instead of signed multipliers. This approximation, in turn, introduces errors in gain compensation. The amount of percentage errors depends on whether a 2D, Householder 3D, or 4D CORDIC processor is used. The maximum gain compensation has been found to be not greater than 2.45%.

Output controller 200b is the last stage in the pipelined architecture. Output controller 200b may perform both inverse coarse rotation to compensate for the input coarse rotation and output scaling to compensate for the CORDIC processing gain. Output controller 200b is configured to output a complex R matrix and complex z vectors. In an embodiment, the complex R matrix includes a 4×4 complex matrix and the complex z vectors comprises four output 4×1 complex z vectors with $z=Q^H*y$. In an embodiment, both input and output controllers 220a, 220b reads in or write out 1 complex number (e.g., 2 16-bit real numbers) each clock cycle, by following the scheduling shown in Table C.1 in Appendix B. Of course, even without these approximate optimizations, the embodiment remains advantageous. Further, it will be noted to one of skill in the art that minimizing gate count is generally desirable and that each developer's view of minimized gate count can be different.

The CORDIC modules perform a large number of vectoring and rotation operations within a limited number of cycles. The number of cycles is a design specified concern and so is the gate count. That said, when implemented in an optimized fashion, the present embodiment allows for a small gate count with good performance. The 2D, 3D and 4D CORDIC processors are designed with a primary aim of achieving high throughput to meet the specified design criteria and then, as the secondary aim, gate count is reduced by using various strategies. In general, the 2D, 3D and 4D CORDIC processors, comprise multiple pipelined core stages, where at least one core stage is configured to implement one or more of the CORDIC elementary rotation operations in either vectoring or rotation mode of operation. In addition to the core stages, the CORDIC processors also comprise at least one module to perform input coarse rotation, output inverse coarse rotation and output scaling to compensate for CORDIC processing gain. In an embodiment, the last stage of 2D CORDIC processor, Householder 3D CORDIC processor, and 4D/2D configurable CORDIC processors includes a mechanism to compensate for implicit CORDIC processing gain. In order to reduce area and power requirements, as well as length of critical path, this compensation is approximated using bit shift and add operations, instead of signed multiplication. This approximation, in turn, introduces errors in the gain compensation. The amount of percentage errors depends on whether a 2D CORDIC processor, a Householder CORDIC processor or a 4D CORDIC processor is used. It has been found that the gain compensation factor is not greater than 2.45%. Based on extensive MATLAB simulations, architectural decisions were made to use 8 CORDIC iterations and the two's complement data format for input, output and internal data with a word-length of 16 bits and 11 bits for the fractional part. Of course, other design choices are compatible with the present invention.

One of the strategies used to achieve lower gate count, is to use implicit angle transfer using the elementary rotation directions, rather than explicitly computing and transferring actual rotation angles. This results in a hardware savings of approximately 30%, since the hardware resource's in the angle datapath are removable. Also, since each CORDIC core stage performs a fixed shift, it is performable using re wiring of the input operands and hence the area intensive barrel shifters are obviated. Another hardware saving strategy is to re-use the CORDIC stages to perform more than one elementary rotation per stage. This reduces a number of pipelined stages and increases the datapath hardware utilization significantly.

It should be appreciated that the present invention does not rely on any multiplier, divider, square-root or RAM modules. That is, the QR decomposition does not include any multiplication, division, square-root operations. In an embodiment, a CORDIC processor may include a gain scaling circuit having only an adder and a fixed shift circuit. Thus, these strategies result in considerable gate count reduction, while achieving similar performance.

In an embodiment, Stage 1 includes a 2D un-rolled CORDIC processor 245a and Stage 4 includes a 2D un-rolled CORDIC processor 245d. The 2D CORDIC processor can complete 2 sets of conventional 2D CORDIC elementary rotations in a single clock cycle. In an embodiment, a same set of 16-bit signed adders is used twice and multiplexers are used to select the input values to these adders, to implement one set of CORDIC equations in each half of the clock cycle. In Stage 1, 2D CORDIC processor 245a performs four 2D vectoring and twenty four 2D rotation operations, and in Stage 4, 2D CORDIC processor 245d performs three 2D vectoring and twenty four 2D rotation operations, within 40 cycles.

Stage 3 includes a 3D un-rolled CORDIC processor 245c that can perform two sets of Householder 3D CORDIC elementary rotation processes within two clock cycles. FIG. 3 shows an exemplary logic schematic of a single stage of the Householder 3D un-rolled CORDIC processor, wherein the top two adders compute $X_1^{i+1}$ and the bottom two adders compute $X_2^{i+1}$ and $X_3^{i+1}$, within a single clock cycle, using the Householder 3D CORDIC processes. The output values $X_1^{i+1}$, $X_2^{i+1}$ and $X_3^{i+1}$ are then fed back as input values to the same stage, and the same procedure is used to compute $X_1^{i+2}$, $X_2^{i+2}$ and $X_3^{i+2}$, which serve as the final output values of the stage. The un-rolled 3D CORDIC processor is used in Stage 3 of the QRD core to perform one 3D vectoring and twelve 3D rotation operations. In an embodiment, the four signed adders are used a total of 4 times, within 2 clock cycles, to implement the 2 iterations of the Householder 3D CORDIC equations. The multiplexers are controlled by the clock signal to provide appropriate inputs to the adders. In an embodiment, the Householder 3D CORDIC processor can perform 1 3D Vectoring and 12 3D Rotation operations within 34 clock cycles.

Stage 2 of QRD comprises a 4D/2D configurable un-rolled CORDIC processor that includes 8 single stages connected in series. Each of the 8 single stages is programmable to operate in either 4D or 2D mode. In the 2D mode of operation, each stage of the 4D/2D configurable CORDIC processor can perform four 2D Vectoring or Rotation operations in parallel, in a single clock cycle. In the 4D mode of operation, each stage can perform a single Vectoring or Rotation operation within a single clock cycle.

Figure 4:
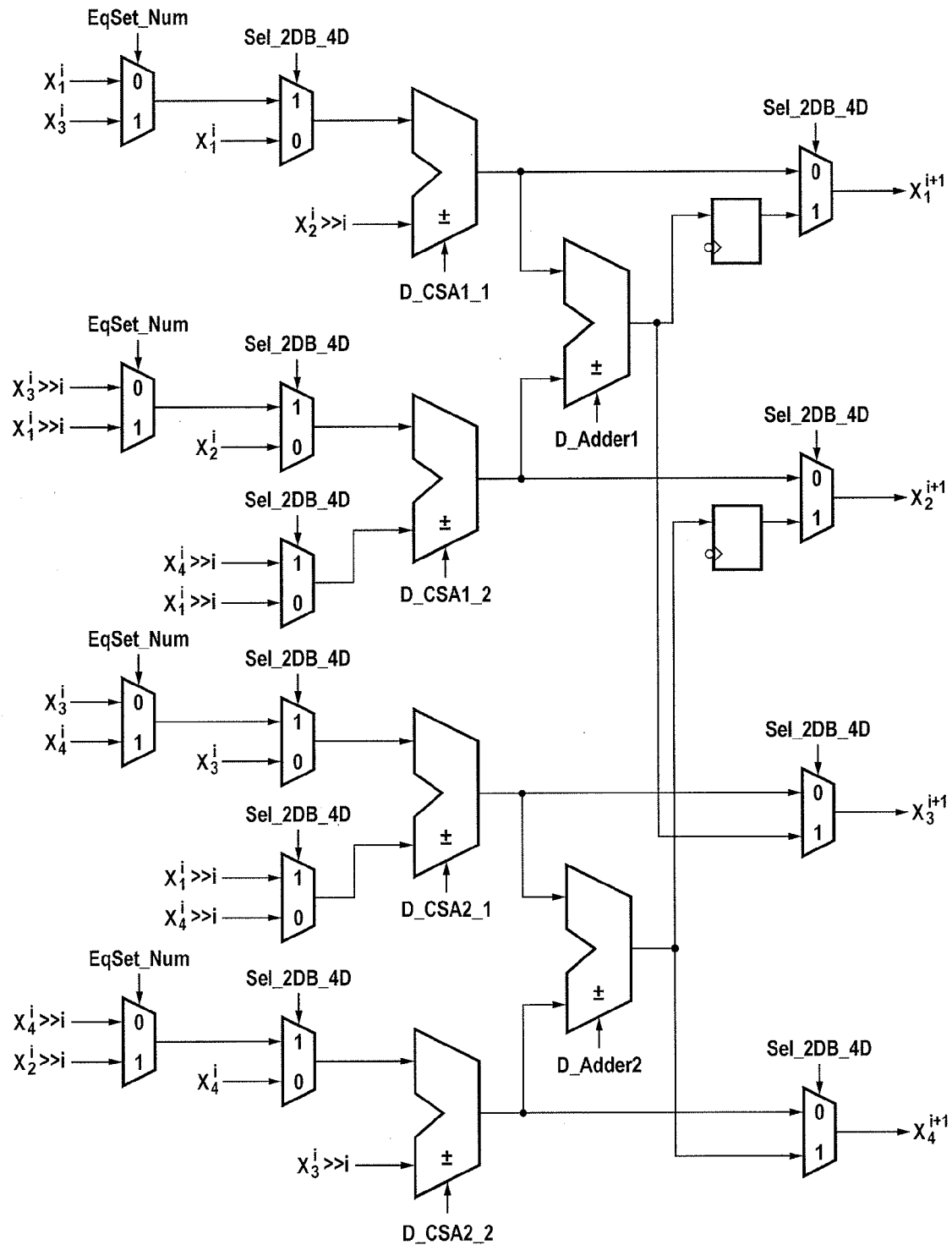
FIG. 4 illustrates a simplified schematic diagram of a single stage architecture for the 4D/2D configurable CORDIC Processor, according to an embodiment of the invention.

FIG. 4 shows an exemplary schematic block diagram of a single stage 4D/2D configurable un-rolled CORDIC processor. The multiplexers select the input data and rotation directions for the adders according to the mode of operation (2D or 4D). Since, in the 4D mode of operation, each of these adders are used twice, the multiplexers are cascaded to select the adder inputs. For the 4D mode of operation, the adders are used to compute $X_1^{i+1}$ and $X_2^{i+1}$ in the first half of the clock cycle, and $X_3^{i+1}$ and $X_4^{i+1}$ in the second half of the clock cycle. In the 2D mode of operation, the CORDIC processor performs Vectoring and Rotation operations on two sets 2D vectors, [X1i X2i]T and [X3i X4i]T, in parallel, in each half of the clock cycle. In other words, the adders compute [X1i+1 X2i+1]T in the first half of the clock cycle, for the first set of two 2D input vectors. The same process is repeated in the second half of the clock cycle to compute updated vectors for the second set of two 2D input vectors. In an embodiment, the 4D/2D configurable CORDIC processor performs a total of one 4D vectoring, fourteen 4D rotation, three 2D vectoring and eighteen 2D rotation operations within 36 clock cycles.

QR Decomposition—Algorithm and VLSI Implementation

Several types of channel pre-processing operations run in parallel with MIMO detection, one of which is the QR Decomposition (QRD) of the estimated channel characteristic matrix. QRD is required by many types of MIMO detection schemes, such as Successive Interference Cancellation (SIC), V-BLAST, K-Best, Sphere Decoding and many other schemes. It is used in MIMO receivers to transform the $N_R \times N_T$ complex channel matrix H into a $N_R \times N_T$ unitary and orthonormal matrix Q (such that $Q^H Q = I$, where $Q^H = (Q^T)^*$) and a $N_T \times N_T$ upper triangular matrix R. As discussed in Section 2.1, these complex matrices Q and R, along with the received symbol vector, y, are then used by the MIMO detector to estimate the transmitted symbol vector, s. The major reason why QR Decomposition is preferred for MIMO receivers, compared other matrix triangularization schemes, is because of the fact that the matrix Q generated by QR Decomposition is a unitary matrix, which helps to avoid the noise enhancement problem and keeps noise spatially white.

Many new 4G wireless standards require MIMO systems with high data rates, high mobility and large antenna configurations. For example, the IEEE 802.16m and LTE-Advanced standards include applications with mobile speeds up to 350 km/h, maximum antenna configuration of 8×8 and Downlink peak data rates of up to 1 Gbps. Furthermore, the high-mobility applications involve dynamic and fast-varying channel environments, which require channel estimation and QR Decomposition to be performed very frequently, for every few channel uses. Thus, it is desired to minimize the QRD Processing Latency, which is formally defined as the number of cycles after which a new set of QRD outputs is ready. Also, for MIMO receivers to be used in battery-operated mobile devices, it is desired to minimize QRD power dissipation and silicon area as much as possible. Hence, to summarize, the applications in the emerging 4G wireless standards require QRD implementations for decomposing large complex channel matrices, while minimizing QRD processing latency, silicon area and power consumption requirements.

In the following, QR Decompositions are listed and implementation challenges are described. Various types of CORDIC algorithms that provide a low complexity method to implement vector rotations that are executed during QR Decomposition are then described. The QRD, in accordance with the present, is then described and its computational complexity is analyzed. The overall VLSI architecture of the QRD core and functionality for each of the individual sub-blocks are subsequently described.

Existing QR Decomposition Schemes and Implementation Challenges

The 3 basic methods for computing matrix QR Decomposition include: the Modified Gram-Schmidt Orthonormalization (MGS) algorithm, Householder transformations and Givens rotations. The MGS algorithm computes Q and R matrices, column by column, by using vector projection, norm and other computations, see "Matrix Computation," G. H. Golub and C. F. V. Loan, John Hopkins University Press, 1996. However, for fixed-precision arithmetic, it offers lesser accuracy and numerical stability due to round-off errors and loss of orthogonality introduced during the vector projections onto planes. Also, a straight-forward implementation of this algorithm requires multiplication, division and square-root operations, which lead to high implementation complexity and high computation latency.

In a publication entitled "VLSI Architecture for Matrix Inversion using Modified Gram-Schmidt based QR Decomposition," International Conference on VLSI Design, pp. 836-841, January 2007, authors C. Singh, S. Prasad, and P. Balsara propose an idea of using log-domain computations to implement multiplication, division and square-root operations using low-complexity adders, subtractors and shifters. However, this scheme requires frequent conversions between log and linear domains using LOG ($log_2(x)$) and EXP($2^x$) Look-Up Tables (LUT). Hence, a VLSI implementation for this scheme requires a large storage space to hold these Look-Up Tables and results in large gate count. In a 0.18 μm CMOS technology, this design requires a core area of 72 KG and attains a QRD processing latency of 67 cycles at a clock frequency of 277 MHz. To reduce the gate count, P. Salmea, A. Burian, H. Sorokin, and J. Takala in "Complex-valued QR decomposition implementation for MIMO receivers," in Proc. IEEE ICASSP 2008, pp. 1433-1436, April 2008, propose a modified MGS scheme that reduces circuit complexity and power consumption by using an approximation in the MGS algorithm step that requires division by a real-valued norm. Since multiplication is a simpler operation to implement than division, the publication "Complex-valued QR decomposition implementation for MIMO receivers," in Proc. IEEE ICASSP 2008, pp. 1433-1436, April 2008, substitutes the division and square-root computations with multiplication and inverse square-root ($1/\sqrt{x}$) calculations. The computation of the inverse square-root is further approximated by using the following function, that is attained by manual curve fitting within the desired range of x:

$$\frac{1}{\sqrt{x}} \approx 0.965820 - \left(\frac{1}{4}\right)x - \left(\frac{1}{32}\right)x$$

However, since this QRD scheme uses an approximation to an actual function, for fixed-precision arithmetic, it might lead to a degradation in the bit error rate (BER) performance of the MIMO detector. Furthermore, since the QRD core presented in [34] uses an iterative architecture, it incurs a very large processing latency. In 0.13 μm CMOS, this QRD design requires a QRD processing latency of 139 clock cycles at 269 MHz and requires only 23.3 KG silicon area.

As another way of computing Q and R matrices, Householder transformations can be used to transform the input channel matrix H to the final upper-triangular R matrix, by eliminating all of the elements below the diagonal in a column simultaneously, see "Matrix Computation," G. H. Golub and C. F. V. Loan, John Hopkins University Press, 1996. However, a major disadvantage of Householder transformations, when used for QR De-composition, is that since a Householder reflection operates on all of the matrix rows simultaneously, it is not straightforward to carry out multiple reflections in parallel, which could have helped to speed up the QR Decomposition process, see "Load balanced Parallel QR decomposition on Shared Memory Multiprocessor," J. Boleng and M. Misra, Parallel Computing, vol. 27, pp. 1321-1345, September 2001. Also, a straightforward VLSI implementation of the Householder algorithm requires multiplication, division and square-root operations, and hence leads to very high hardware complexity.

As an alternative, Givens rotations have the capability of selectively annihilating individual matrix elements by rotating two-dimensional real or complex column vectors to align them with the pivot axis. Since Givens Rotations work on two matrix rows at a time, they can be more easily parallelized, to reduce the QR Decomposition processing latency. Application of Givens rotations to two-dimensional column vectors within the input H matrix can be implemented using either multiply-and-add operations or more commonly using the Coordinate Rotation Digital Computer (CORDIC) algorithm, see "A survey of CORDIC algorithms for FPGA based computers," R. Andraka, Proc. of the 1998 ACM/SIGDA sixth international symposium on filed programmable gate arrays, pp. 191-200, February 1998. The Vectoring and Rotation modes of the CORDIC algorithm can be used to approximate vector rotation and hence perform Givens rotations using low-complexity shift and add operations. Hence, the capability of performing multiple Givens rotations in parallel, which in turn leads to higher throughput, as well as the lower hardware complexity of the CORDIC modules makes Givens rotations the method of choice for implementing QR Decomposition.

However, for matrices with large dimensions (e.g. 4×4 complex), performing QRD using the conventional sequence of Givens rotations might lead to high computational complexity, due to the large number of Vectoring and Rotation operations required. For an example of MIMO systems with 4 transmit and 4 receive antennas, the process of decomposing a 4×4 complex channel characteristic matrix H into 4×4 complex matrices Q and R using the conventional sequence of Givens rotations will require a total of 26 real Vectoring and 200 real Rotation operations. In "VLSI Implementation of a high-speed iterative sorted MMSE QR decomposition," P. Luethi, A. Burg, S. Haene, D. Perels, N. Felber, and Fichtner, Proc. IEEE ISCAS 2007, pp. 1421-1424, May 2007, QRD for a 4×4 complex matrix H is implemented using the conventional sequence of Givens rotations, which attains the processing latency of 67 cycles at 125 MHz clock frequency, and requires 54 KG in 0.25 μm CMOS technology. Furthermore, as is described in detail in below, the sequential nature of annihilations for the $H_{i,j}^{Re}$ matrix elements and the large number of Rotation operations required for each element annihilation causes a throughput bottleneck. These factors will lead to high computational complexity, larger hardware requirements and high power dissipation for throughput-constrained systems. Hence, a QR Decomposition architecture designed using these schemes will not be suitable for use in MIMO receivers embedded within mobile devices, that essentially require signal processing blocks with low power dissipation and low silicon area.

Conventional, Multi-Dimensional and Householder CORDIC Algorithms

The Coordinate Rotation Digital Computer (CORDIC) algorithms, described by J. Volder in "The CORDIC Trigonometric Computing Technique," in IRE Trans. Electronic Computers, vol. 8, no. 3, pp. 330-334, September 1959, and extended by Walther in "A unified algorithm for elementary functions," in Proc. AFIPS Spring joint Computing Conf., vol. 38, pp. 379-385, November 1971, provide the mechanism to perform vector rotations in hardware using low-complexity adders and shifters. Thus, the CORDIC algorithms, in their Vectoring and Rotation modes, can be used to approximate 2D Givens rotations. In the Vectoring mode, the CORDIC algorithm rotates the input vector by a necessary angle to align the resulting vector with the X axis. In the Rotation mode, the input vector is rotated by the specified angle to attain updated co-ordinates of the vector after rotation.

In the Vectoring mode, the output is a rotation angle and the norm of the original vector. The CORDIC algorithm in effect attempts to minimize the Y component of the updated vector at each incremental rotation, and hence it uses the sign of the residual Y component to determine the direction for the next rotation. Since the angle accumulator is initialized with zero and is updated at each incremental rotation, it will contain the traversed angle, i.e. the angle between the vector and the x-axis, at the end of the Vectoring operation. To summarize, in Vectoring mode, the CORDIC elementary rotation equations are:

$$X^{i+1} = X^i - 2^{-i} D^i Y^i$$

$$Y^{i+1} = Y^i - 2^{-i} D^i X^i$$

$$\theta^{i+1} = \theta^i - D^i \tan^{-1}(2^{-i}) \tag{5.1}$$

where, $D^i = -\text{sign}(Y^i)$, see "A survey of CORDIC algorithms for FPGA based computers," R. Andraka, Proc. of the 1998

ACM/SIGDA sixth international symposium on filed programmable gate arrays, pp. 191-200, February 1998. Thus, if the Vectoring operation is completed so that the residual Y component is zero, we have:

$$X^n = A^n \sqrt{(X^0)^2 + (Y^0)^2}$$

$$Y^n = 0$$

$$\theta^n = \tan^{-1}(Y^0/X^0)$$

$$A^n = \Pi\sqrt{1 + 2^{-2i}} \quad (5.2)$$

See, "A survey of CORDIC algorithms for FPGA based computers," R. Andraka, Proc. of the 1998 ACM/SIGDA sixth international symposium on filed programmable gate arrays, pp. 191-200, February 1998. Note, that here $[X^0 Y^0]^T$ and $[X^n Y^n]^T$ represent the input and output vectors to the Vectoring process, respectively. Also, $A^n$ represents the processing gain of the CORDIC algorithm, where n represents the number of CORDIC algorithm iterations.

In the Rotation mode, the angle accumulator is first initialized with the desired rotation angle. The direction of elementary rotations is determined so that the magnitude of the residual angle, in the angle accumulator, is diminished. In this mode, the CORDIC algorithms use the same elementary rotation equations as shown above. However, at each iteration, $D^i$ is determined as: $D^i = \text{sign}(\theta^i)$. Also, once the Rotation operation is completed, the final outputs can be written as:

$$X^n = A^n [X^0 \cos\theta^0 - Y^0 \sin\theta^0]$$

$$Y^n = A^n [Y^0 \cos\theta^0 - X^0 \sin\theta^0]$$

$$\theta^n = 0$$

$$A^n = \Pi\sqrt{1 + 2^{-2i}} \quad (5.3)$$

Note, that the CORDIC algorithms approximate the actual vector rotations by using a series of successively smaller elementary rotations by angles $\tan^{-1} 2^{-i}$. Hence, there is a direct trade-off between n, the number of CORDIC algorithm iterations, the accuracy of the vector rotations and computational complexity of the rotation operation. In other words, an increase in the value of n improves the vector rotation accuracy, however, it leads to larger computational complexity, and hence larger resource requirements.

Multi-Dimensional CORDIC Algorithm

Multi-dimensional Givens rotations operate on column vectors of dimensions larger than 2, to align them with the first axis (Vectoring operation) and then to apply the same rotation to rotate other vectors (Rotation operation). This approach increases the parallelism in the vector rotation operation by processing all components of the vector simultaneously. However, a generic way to implement multi-dimensional Givens rotations, for column vector dimensions 3 or larger, is to use high-complexity multiply-and-accumulate based algorithms. From the VLSI implementation perspective, this results in reduced latency, however, leads to much larger hardware requirements.

To resolve this issue, Delosme and Hsiao in "CORDIC algorithms in four dimensions," Advanced Signal Processing Algorithms, Architectures, and Implementations, Proc. SPIE, vol. 1348, no. 1., pp. 349-360, July 1990, present Multi-dimensional CORDIC algorithms that extend the conventional two-dimensional CORDIC algorithms to 3D and 4D. In other words, the 3D and 4D CORDIC algorithms, presented by Delosme and Hsiao, approximate 3D and 4D Givens rotations using low-complexity shift and addition operations. Note that, the 3D and 4D vector rotation refer to rotations of 3×1 and 4×1 real-valued vectors. The CORDIC elementary rotation equations for 3D Givens rotations is shown below:

$$X_1^{i+1} = X_1^i(1 - 2^{-2i}) + X_2^i(D_1^i 2^{-i+1} + D_1^i D_2^i 2^{-2i+1}) + X_3^i (2D_2^i 2^{-i} + 2^{-2i+1})$$

$$X_2^{i+1} = X_1^i(-D_1^i 2^{-i+1} D_1^i 2^{-2i+1}) + X_2^i(1 - 2^{-2i}) + X_3^i(D_1^i 2^{-i+1} + D_1^i D_2^i 2^{-2i+1})$$

$$X_3^{i+1} = X_1^i(-2D_1^i 2^{-i} + 2^{-2i+1}) + X_2^i(-D_1^i 2^{-i+1} + D_1^i D_2^i 2^{-2i+1}) + X_3^i(1 - 2^{-2i}) \quad (5.4)$$

where, the rotation directions are calculated as: $D_1^i = \text{sign}(X_1^i \cdot X_2^i)$ and $D_2^i = \text{sign}(X_1^i \cdot X_3^i)$. Also, the CORDIC processing gain for the 3D CORDIC algorithm can be calculated using the following equation, for n iterations of this 3D CORDIC algorithm:

$$A^n = \Pi\sqrt{1 + 3 * 2^{-2i}} \quad (5.5)$$

The CORDIC elementary rotation equations for 4D Givens rotations are shown in Eq. 5.6 below:

$$X_1^{i+1} = X_1^i - 2^i D_1^i X_2^i - 2^{-i} D_2^i X_3^i 2^{-i} D_3^i X_4^i$$

$$X_2^{i+1} = 2^{-i} D_1^i X_1^i + X_2^i 2^{-i} D_3^i X_3^i - 2^{-i} D_2^i X_4^i$$

$$X_3^{i+1} = 2^{-i} D_1^i X_1^i - 2^{-i} D_3^i X_2^i + X_3^i 2^{-i} D_1^i X_4^i$$

$$X_4^{i+1} = 2^{-i} D_3^i X_1^i + 2^{-i} D_2^i X_2^i - 2^{-i} D_1^i X_3^i + X_4^i \quad (5.6)$$

where, the rotation directions are calculated as: $D_1^i = -\text{sign}(X_1^i \cdot X_2^i)$, $D_2^i = -\text{sign}(X_1^i \cdot X_3^i)$ and $D_3^i = -\text{sign}(X_1^i \cdot X_4^i)$. Also, the CORDIC processing gain can be given as:

$$A^n = \Pi\sqrt{1 + 3 * 2^{-2i}} \quad (5.7)$$

Since these 3D and 4D CORDIC algorithms can annihilate multiple elements simultaneously (2 elements for the 3D case and 3 elements for the 4D case) using only shift and addition operations, they offer a significant reduction in hardware complexity, as well as reduction in the overall processing latency. The details about hardware implementation of these equations to develop 3D and 4D CORDIC processors are described below.

Householder CORDIC Algorithm

Householder transformations also provide the capability of annihilating multiple elements simultaneously by reflecting a multi-dimensional input vector onto a plane. A straightforward VLSI implementation of the Householder algorithm requires multiplication, division and square-root operations, and hence it leads to very high hardware complexity, see "Matrix Computation," G. H. Golub and C. F. V. Loan, John Hopkins University Press, 1996. To resolve this issue, the publication "Householder CORDIC Algorithms," IEEE Trans. on Computers, vol. 44, no. 8, pp. 990-1001, August 1995, presents a novel Householder CORDIC algorithms that use sequences of simple Householder reflections, which can be easily implemented using shift, carry-save-addition (CSA) and simple addition operations. In the publication "Householder CORDIC Algorithms," IEEE Trans. on Computers, vol. 44, no. 8, pp. 990-1001, August 1995, the authors derive the elementary rotation matrix for generic nD Householder CORDIC algorithms, as products of two simple Householder reflections. The details about the derivation of these elementary rotation matrices and their corresponding control sign selection laws, generalization of these algorithms in Euclidean and pseudo-Euclidean spaces and the algorithm convergence proofs are also presented in the publication "Householder CORDIC Algorithms," IEEE Trans. on Computers, vol. 44, no. 8, pp. 990-1001, August 1995.

The elementary rotation matrix for nD Householder CORDIC algorithm has been customized for 3D and 4D cases using appropriate parameters. Equation 5.8 below shows the rotation equations for a single ($i^{th}$) iteration of the 3D Householder CORDIC algorithm.

$$X_1^{i+1} = X_1^i - 2^{-2i+1}X_1^i + 2^{-2i+1}D_1^i X_2^i + 2^{-i+1}D_2^i X_3^i$$

$$X_2^{i+1} = -2^{-i+1}D_1^i X_1^i + X_2^i - 2^{-2i+1}D_1^i D_2^i X_3^i$$

$$X_3^{i+1} = -2^{-i+1}D_2^i X_1^i - 2^{-2i+1}D_1^i D_2^i X_2^i + X_3^i \qquad (5.8)$$

where, the rotation directions can be obtained from the input operands as: $D_1^i = \text{sign}(X_1^i \cdot X_2^i)$ and $D_2^i = \text{sign}(X_1^i \cdot X_3^i)$. Also, the CORDIC processing gain for the 3D Householder CORDIC algorithm can be calculated using the following equation:

$$A^n = \Pi 1 + 2^{-2i+1} \qquad (5.9)$$

Similarly, the elementary rotation equations for $i^{th}$ iteration of the 4D CORDIC algorithm can be derived as follows:

$$X_1^{i+1} = X_1^i(1 - 3*2^{-2i}) + X_2^i(2^{-i+1}D_1^i) + X_3^i(2^{-i+1}D_2^i) + X_4^i(2^{-i+1}D_3^i)$$

$$X_2^{i+1} = X_1^i(2^{-i+1}D_1^i) + X_2^i(1 + 2^{-2i}) + X_3^i(-2^{-2i+1}D_1^i D_2^i) + X_4^i(-2^{-2i+1}D_1^i D_3^i)$$

$$X_3^{i+1} = X_1^i(-2^{-i+1}D_2^i) + X_2^i(-2^{-2i+1}D_1^i D_2^i) + X_3^i(1 + 2^{-2i}) + X_4^i(-2^{-2i+1}D_2^i D_3^i)$$

$$X_4^{i+1} = X_1^i(-2^{-i+1}D_3^i) + X_2^i(-2^{-2i+1}D_1^i D_3^i) + X_3^i(-2^{-2i+1}D_2^i D_3^i) + X_4^i(1 + 2^{-2i}) \qquad (5.10)$$

where, the rotation directions can be obtained from the input operands as: $D_1^i = \text{sign}(X_1^i \cdot X_2^i)$, $D_2^i = \text{sign}(X_1^i \cdot X_3^i)$ and $D_3^i = \text{sign}(X_1^i \cdot X_4^i)$. Also, the CORDIC processing gain for the 4D Householder CORDIC algorithm can be calculated using the following equation, for n iterations of this 4D Householder CORDIC algorithm:

$$A^n = \Pi 1 + 3^{-2i+1} \qquad (5.11)$$

FIG. 5 illustrates the Element Annihilation Sequence for the Conventional Givens Rotations QRD Scheme.

QR Decomposition scheme

As described above, the three popular methods for computing QR Decomposition include the Modified Gram-Schmidt Orthonormalization (MGS) algorithm, Householder transformations and Givens rotations. Among these, the Givens rotations method is superior in terms of BER performance and hardware complexity, compared to the other two methods. However, QR Decomposition of the channel characteristic matrix H using the conventional sequence of Givens rotations, as described by El-Amawy and Dharmarajan in "Parallel VLSI algorithm for stable inversion of dense matrices," Computers and Digital Techniques, IEEE Proc., vol. 136, no. 6, pp. 575-580, November 1989, leads to an excessive amount of computations, since it does not exploit the symmetry between the adjacent columns of the H matrix. For example, QRD of a 4×4 complex channel matrix H and computation of $z = Q^H * y$ for 4 input 4×1 complex y vectors using the conventional sequence of Givens rotations requires a total of 26 Vectoring and 200 Rotation operations.

Hwang and Chen in "A low complexity complex QR factorization design for signal detection in MIMO OFDM systems," in Proc. IEEE ISCAS 2008, pp. 932-935, May 2008, present a modified sequence of Givens rotations that helps to keep the symmetry of the H matrix intact during the triangularization process, and hence reduces the number of element annihilations and corresponding Rotation operations required. Note that use of this scheme produces 4 upper-triangular sub-matrices. However, if a modified Real Value Decomposition (RVD), as shown in FIG. 5, is used to convert the complex 4×4 $\tilde{H}$ matrix to its real counterpart (H), then a strictly upper-triangular 8×8 real-valued R matrix can be attained using this scheme.

Application of the modified sequence of Givens rotations on the H matrix created using the modified RVD scheme will keep the symmetry between the adjacent columns intact during the triangularization process. Hence, this will reduce the total number of Vectoring operations required to 16, however, the number of Rotation operations required is 136, which is still very large. This will lead to high computational complexity and hence larger hardware requirements for throughput-constrained systems. For example, in order to attain a QR Decomposition processing latency of 40 clock cycles and assuming that each Vectoring or Rotation operation requires 8 clock cycles (assume 8 iterations of the CORDIC algorithm), the complete QR Decomposition core will require a total of (16+136)/5=31 iterative CORDIC processors. On the other hand, for hardware constrained systems, this will increase the QRD processing latency, and hence reduce throughput by a considerable amount.

By taking a closer look at the triangularization process, it can be noticed that the Vectoring and Rotation operations corresponding to the annihilation of the $H_{i,j}^{Im}$ elements can be performed in a completely parallel manner, since they operate on independent set of rows of the H matrix. For example, for the H matrix shown in FIG. 5, Givens rotations to annihilate the $H_{3,1}^{Im}$ and $H_{4,1}^{Im}$ elements will operate on row pairs 5, 6 and 7, 8 of the H matrix, respectively, and hence they can be executed in parallel. However, annihilation of the $H_{i,j}^{Re}$ elements and their corresponding Rotation operations have to be performed sequentially. For example, the Givens rotations to annihilate the $H_{3,1}^{Re}$ and $H_{4,1}^{Re}$ elements will operate on row pairs 3,5 and 5,7 of the H matrix, respectively, and hence they can not be performed in parallel. We must first perform Givens rotations to annihilate the $H_{4,1}^{Re}$ element using the $H_{3,1}^{Re}$ element as a pivot element and then annihilate the $H_{3,1}^{Re}$ element by using $H_{2,1}^{Re}$ as the pivot element. Another issue with the annihilation of $H_{i,j}^{Re}$ elements is that the number of Rotation operations required corresponding to the annihilation of each $H_{i,j}^{Re}$ elements is very large. For example, for annihilation of the $H_{i,j}^{Re}$ element, Givens rotations need to be performed on all columns of rows 5,7 and 6,8. Hence, annihilation of each $H_{i,j}^{Re}$ element requires twice the number of Rotation operations, compared to those for $H_{i,j}^{Im}$. Thus, to summarize, the Givens rotations corresponding to the annihilation of the $H_{i,j}^{Re}$ elements contribute the most to the total number of Rotations and they have to be performed sequentially, and hence they cause a throughput bottleneck and increased hardware complexity.

To resolve these issues, a hybrid QR Decomposition scheme, in accordance with the present invention, uses a combination of Multi-dimensional Givens rotations, Householder transformations and the conventional two-dimensional Givens rotations to compute the QR Decomposition of a 4×4 complex channel matrix $\tilde{H}$ and to compute the $z = Q^H * y$ for 4 input 4×1 complex y vectors. Such a hybrid QR Decomposition scheme relieves the throughput bottleneck and reduces the hardware complexity by first decreasing the number of Rotation operations required and then by enabling their parallel execution. To achieve this, multiple $H_{i,j}^{Re}$ elements are annihilated in parallel, by using Multi-dimensional Givens rotations and Householder trans-formations. Circuit complexity is reduced by implementing these multi-dimensional vector rotations using CORDIC algorithms that only utilize low-complexity shift and addition operations. Also, for the $H_{i,j}^{Im}$ elements, that do allow parallel Vectoring and Rotation operations, the 2D Givens rotations can be used to perform annihilation with maximum parallelism and minimal complexity.

Embodiments of the present invention use the special sequence of element annihilations, see "A low complexity complex QR factorization design for signal detection in MIMO OFDM systems," Hwang and Chen, Proc. IEEE ISCAS 2008, pp. 932-935, May 2008, that keeps the symmetry between the adjacent columns of H intact. Hence, embodiments of the present invention will only need to perform Vectoring and Rotation operations on odd numbered columns of H, and the values for the elements in the even numbered columns can be derived directly, without any computations. Also, embodiments of the present invention use the Multi-dimensional CORDIC and Householder CORDIC algorithms, described above, to implement Multi-dimensional Givens rotations and Householder transformations for 3D and 4D vectors. The elementary rotation equations for 3D CORDIC, 4D CORDIC, Householder 3D CORDIC and Householder 4D CORDIC algorithms, shown in Equations (5.4), (5.6), (5.8) and (5.10) respectively, were compared for their implementation complexity. The comparison results were then used to make the decision about which algorithms to use for 3D and for 4D vector rotations. It was decided to use Householder CORDIC algorithms for 3D vector rotations and the Multi-dimensional CORDIC algorithms for 4D vector rotations.

The QR Decomposition scheme, in accordance with the present invention, for 4×4 complex matrix is shown in Table I. The algorithm begins with annihilating the $H_{i,j}^{Im}$ elements in the first column of the H matrix. As mentioned above, the Vectoring and Rotation operations corresponding to the annihilation of the $H_{i,j}^{Im}$ elements can be performed in a completely parallel manner, and hence the conventional 2D Givens rotations are used for these element annihilations. After the nullification of the $H_{i,j}^{Im}$ elements in the first column of H, the algorithm uses 4D Givens rotations to annihilate the elements $H_{4,1}^{Re}$, $H_{3,1}^{Re}$ and $H_{2,1}^{Re}$ simultaneously. As mentioned above, using the conventional 2D Givens rotations, the annihilation of these elements had to be performed sequentially, which led to very large number of sequential Rotation operations and hence a throughput bottleneck. However, using the 4D Givens rotations, the annihilation is performed in parallel and the corresponding number of Rotation operations has been reduced by a factor of 3. Specifically, the 4D Givens rotations propagate the effect of $H_{i,1}^{Re}$ element annihilation to rows 1, 2, 3, 4 and 5, 6, 7, 8 simultaneously, and hence reduces the number of Rotation operations required from 42 to 14.

TABLE I

| | |
|---|---|
| 1) | Annihilate $H_{1,1}^{Im}$, $H_{2,1}^{Im}$, $H_{3,1}^{Im}$ and $H_{4,1}^{Im}$ using 2D CORDIC algorithm. |
| 2) | Annihilate ($H_{2,1}^{Re}$, $H_{3,1}^{Re}$, $H_{4,1}^{Re}$) using 4D CORDIC algorithm. |
| 3) | Annihilate $H_{2,2}^{Im}$, $H_{3,2}^{Im}$ and $H_{4,2}^{Im}$ in parallel using 2D CORDIC algorithm. |
| 4) | Annihilate ($H_{3,2}^{Re}$, $H_{4,2}^{Re}$) using Householder 3D CORDIC algorithm. |
| 5) | Annihilate $H_{3,3}^{Im}$ and $H_{4,3}^{Im}$ using 2D CORDIC algorithm. |
| 6) | Annihilate $H_{4,3}^{Re}$ using 2D CORDIC algorithm. |
| 7) | Annihilate $H_{4,4}^{Im}$ using 2D CORDIC algorithm. |

The conventional 2D Givens rotations are used once again to perform parallel annihilation of the $H_{i,2}^{Im}$ elements in the third column of the H matrix. The scheme then uses the 3D Householder CORDIC algorithm described in "Householder CORDIC Algorithms," IEEE Trans. on Computers, vol. 44, no. 8, pp. 990-1001, August 1995 to annihilate $H_{4,2}^{Re}$ and $H_{3,2}^{Re}$ simultaneously. The effect of element annihilation is propagated to non-zero elements in rows 2, 3, 4 and 6, 7, 8 in parallel, and this further reduces the number of corresponding rotation operations by a factor of 2. As the last step, the algorithm annihilates the $H_{3,5}^{Im}$, $H_{4,3}^{Im}$, $H_{4,3}^{Re}$ and $H_{4,4}^{Re}$ elements, in the order given, using the conventional 2D Givens rotations.

FIG. 6 demonstrates the annihilation order used, in accordance with the embodiments of the present invention, where the number on top of each arrow shows the sequential step number in the annihilation process. For example, the number "1" on top of arrows for $H_{1,1}^{Im}$, $H_{2,1}^{Im}$, $H_{3,1}^{Im}$ and $H_{4,1}^{Im}$ demonstrate that all of these four elements are annihilated in step 1, in a completely parallel manner. Also, from FIG. 5 and FIG. 6, it can be noticed that the scheme in accordance with embodiments of the present invention annihilates the $H_{2,1}^{Re}$, $H_{3,1}^{Re}$ and $H_{4,1}^{Re}$ elements simultaneously in step 2, as opposed to the conventional Givens rotation scheme that annihilates these elements in 3 sequential steps (steps 2, 3 and 4 in FIG. 5). The similar observation can be made for annihilation of elements $H_{3,2}^{Re}$ and $H_{4,2}^{Re}$. Thus, a scheme, in accordance with embodiments of the present invention reduces the number of sequential steps required, and hence reduces the overall QRD processing latency.

QRD Scheme

A QRD scheme, in accordance with the embodiments of the present invention, is described above for decomposition of a 4×4 complex channel characteristic matrix H. However, it can be generalized to perform QR Decomposition of matrices of any size, by appropriately using the 2D and 4D CORDIC algorithms and the Householder 3D CORDIC algorithm. This generalization for QR Decomposition of an n×n complex matrix can be performed using the following:

1. For element annihilations that operate on independent sets of rows of H and can be parallelized, use the conventional 2D CORDIC algorithm to attain maximum parallelization and minimal computational complexity;
2. For sequential element annihilations that use common pivot rows, use Householder 3D CORDIC and 4D CORDIC algorithms to nullify these elements simultaneously, and hence reduce latency by a factor of 2 and 3, respectively, and also remove the throughput bottleneck.

In an exemplary embodiment, an extended QRD scheme for 6×6 complex channel matrix, derived using the ideas listed above, is shown in Table II. As shown, this example requires a total of 11 sequential steps that use either of 2D, Householder 3D or 4D CORDIC algorithms to nullify the elements of the input 6×6 complex H matrix, to convert it to an upper-triangular R matrix. Note that, according to Delosme and Hsiao in "CORDIC algorithms in four dimensions," Advanced Signal Processing Algorithms, Architectures, and Implementations, Proc. SPIE, vol. 1348, no. 1., pp. 349-360, July 1990, for vector rotations with dimensions larger than 4, the multiply-and-accumulate based algorithms offer lower computational complexity compared to the Multi-dimensional and Householder CORDIC algorithms. Hence, the extensions of the QRD scheme of the present invention to n×n matrices should avoid using CORDIC algorithms of dimensions larger than 4.

The element annihilation sequence shown in Table II for QRD of 6×6 complex matrix uses the low-complexity 2D CORDIC algorithm described in "A survey of CORDIC algorithms for FPGA based computers," R. Andraka, Proc. of the 1998 ACM/SIGDA sixth international symposium on filed programmable gate arrays, pp. 191-200, February 1998, to annihilate the necessary $H_{i,j}^{Im}$ elements in parallel. For annihilation of the $H_{i,j}^{Re}$ elements, embodiments of the present invention use the optimal number of 4D, Householder 3D and 2D CORDIC vector rotations, such that the number of sequential steps required to annihilate the necessary $H_{i,j}^{Re}$ elements in each column is minimized. For example, for column 1 of 6×6 H matrix, embodiments of the present invention annihilate a total of 5 $H_{i,1}^{Re}$ elements. Hence, an embodiment of the present invention uses the 4D CORDIC algorithm to annihilate $H_{6,1}^{Re}$ $H_{5,1}^{Re}$, and $H_{4,1}^{Re}$ elements simultaneously, and then uses the Householder 3D CORDIC algorithm to nullify the remaining 2 elements, $H_{3,1}^{Re}$ and $H_{2,1}^{Re}$. Thus, all 5 elements in column 1 are annihilated using only 2 sequential steps, as opposed to 5 sequential steps required using the 2D CORDIC algorithm.

As can be seen from Table II, a QRD scheme, in accordance with embodiments of the present invention, requires 3 4D Vectoring, 24 4D Rotation, 2 Householder 3D Vectoring, 14 Householder 3D Rotation, 23 2D Vectoring and 80 2D Rotation operations to perform QRD of a 6×6 complex matrix. Through mathematical analysis, the number of 2D, Householder 3D and 4D Vectoring and Rotation operations required for QR Decomposition of an n×n complex matrix have been derived as shown in Table III. Thus, from these equations, QRD of 4×4 complex matrix requires 1 4D Vectoring, 6 4D Rotation, 1 Householder 3D Vectoring, 4 Householder 3D Rotation, 11 2D Vectoring and 21 2D Rotation operations. Furthermore, QRD of an 8×8 complex matrix requires 7 4D Vectoring, 76 4D Rotation, 2 Householder 3D Vectoring, 14 Householder 3D Rotation, 39 2D Vectoring and 191 2D Rotation operations.

To summarize, the generalization of a QRD scheme, in accordance with embodiments of the present invention, for processing n×n complex matrices can be performed by appropriately utilizing the 2D, Householder 3D and 4D CORDIC algorithms, according to the rules mentioned above, depending on the type and number of element annihilations to be performed. As described above, a QRD scheme, in accordance with embodiments of the present invention, reduces the number of sequential annihilation steps required significantly, and hence reduces the QRD processing latency and removes the throughput bottleneck, compared to the existing Givens rotations based QRD schemes. A QRD scheme, in accordance with embodiments of the present invention, also utilizes the low-complexity CORDIC algorithms for two-dimensional and multi-dimensional vector rotations, that results in a substantial reduction in the computational complexity required for QRD calculation.

TABLE III

| Operation | Number of Operations Required for n × n Complex Matrix |
|---|---|
| 4D Vectoring | $\sum_{i=1}^{n-2} \left( \left\lfloor \frac{n-i}{3} \right\rfloor \right)$ |
| 4D Rotation | $\sum_{i=1}^{n-2} \left[ \left( \left\lfloor \frac{n-i}{3} \right\rfloor \right) \times 2(n-i) \right]$ |
| Householder 3D Vectoring | $\sum_{i=1}^{n-2} \left( \left\lfloor \frac{(n-i) - \left(3 \left\lfloor \frac{n-i}{3} \right\rfloor\right)}{2} \right\rfloor \right)$ |
| Householder 3D Rotation | $\sum_{i=1}^{n-2} \left[ \left( \left\lfloor \frac{(n-i) - \left(3 \left\lfloor \frac{n-i}{3} \right\rfloor\right)}{2} \right\rfloor \right) \times 2(n-i) \right]$ |
| 2D Vectoring | $\sum_{i=1}^{n-2} \left[ (n-i) - \left(3 \left\lfloor \frac{n-i}{3} \right\rfloor\right) - \left(2 \left\lfloor \frac{n-i}{2} \right\rfloor\right) \right] + \sum_{i=1}^{n} (n-i+1) + 1$ |
| 2D Rotation | $\sum_{i=1}^{n-2} \left[ (n-i) - \left(3 \left\lfloor \frac{n-i}{3} \right\rfloor\right) - \left(2 \left\lfloor \frac{n-i}{2} \right\rfloor\right) \right] \times (n-i) +$ $\sum_{i=1}^{n} (n-i+1) \times (n-i) + 1$ |

QR Decomposition—Overall Architecture Description

Emerging 4G wireless standards require QR Decomposition implementations for processing large complex channel matrices, while minimizing QRD processing latency, silicon area and power consumption requirements. For decomposition of large complex matrices, the existing QRD schemes lead to high computational complexity, sequential throughput bottleneck and lack of parallelism. Hence, the published QRD VLSI implementations, using these existing schemes, either lead to large QRD processing latency or to large silicon area and power requirements. A hybrid QR Decomposition scheme that uses a unique combination of Multi-dimensional Givens rotations, Householder trans-formations and the conventional 2D Givens rotations to reduce the computational complexity and achieve higher execution parallelism, in accordance with the present invention, is described above. This hybrid QRD scheme may be further utilized to develop

TABLE II

1) Annihilate $H_{1,1}^{Im}, H_{2,1}^{Im}, H_{3,1}^{Im}, H_{4,1}^{Im}, H_{5,1}^{Im}$ and $H_{6,1}^{Im}$ in parallel using 2D CORDIC algorithm.
2) Annihilate $(H_{6,1}^{Re}, H_{5,1}^{Re}, H_{4,1}^{Re})$ using 4D CORDIC algorithm.
3) Annihilate $(H_{3,1}^{Re}, H_{2,1}^{Re})$ using Householder 3D CORDIC algorithm.
4) Annihilate $H_{2,2}^{Im}, H_{3,2}^{Im}, H_{4,2}^{Im}, H_{5,2}^{Im}$ and $H_{6,2}^{Im}$ in parallel using 2D CORDIC algorithm.
5) Annihilate $(H_{6,2}^{Re}, H_{5,2}^{Re}, H_{4,2}^{Re})$ using 4D CORDIC algorithm.
6) Annihilate $H_{3,2}^{Re}$ using 2D CORDIC algorithm.
7) Annihilate $H_{3,3}^{Im}, H_{4,3}^{Im}, H_{5,3}^{Im}$ and $H_{6,3}^{Im}$ in parallel using 2D CORDIC algorithm.
8) Annihilate $(H_{6,3}^{Re}, H_{5,3}^{Re}, H_{4,3}^{Re})$ using 4D CORDIC algorithm.
9) Annihilate $H_{4,4}^{Im}, H_{5,4}^{Im}$ and $H_{6,4}^{Im}$ in parallel using 2D CORDIC algorithm.
10) Annihilate $(H_{6,4}^{Re}, H_{5,4}^{Re})$ using Householder 3D CORDIC algorithm.
11) Annihilate $H_{5,5}^{Im}$ and $H_{6,5}^{Im}$ in parallel using 2D CORDIC algorithm.
12) Annihilate $H_{6,5}^{Re}$ using 2D CORDIC algorithm.
13) Annihilate $H_{6,6}^{Im}$ using 2D CORDIC algorithm.

a VLSI architecture for a QRD core to decompose a 4×4 complex channel matrix H, and compute updated symbol vectors $z=Q^{H}*y$ for four received 4×1 complex y vectors, as described further below.

As described above, it is desired to develop a QRD architecture that decomposes large channel matrices with minimal QRD processing latency, and also minimizes gate count and power consumption requirements as much as possible. Considering the large number of Vectoring and Rotation operations that need to be performed to output 4×4 complex R matrix and four 4×1 complex z vectors, an architecture with linear or triangular systolic arrays will require an extremely large amount of hardware resources, see "Triangular systolic array with reduced latency for QR-decomposition of complex matrices," Maltsev, Pestretsov, Maslennikov, and Khoryaev, Proc. IEEE ISCAS 2006, pp. 1421-1424, May 2006. On the other hand, an iterative architecture where one or more CORDIC processors are used repeatedly to perform the complete QR Decomposition, will have much smaller silicon area and power requirements, however, they will lead to very large QRD processing latency, due to the large number of Vectoring and Rotation operations that need to be done iteratively, see "Parametric minimum hardware QR-factoriser architecture for V-BLAST detection," Sobhanmanesh and Nooshabadi, IEEE Proc. on circuits, devices and systems, vol. 153, no. 5, pp. 433-441, October 2006. In order to perform the large number of Vectoring and Rotation operations required to compute a new R matrix and 4 complex z vectors in the smallest possible number of cycles, while also minimizing the area and power requirements, embodiments of the present invention provide an efficient semi-pipelined semi-iterative architecture that uses un-rolled CORDIC processors iteratively, along with complex controllers, to maximize throughput and resource utilization, while minimizing the area and power requirements. The QRD architecture of the present invention attains a processing latency of merely 40 clock cycles at 278 MHz, while occupying 0.3 mm$^2$ core area (36 KG) and dissipating 48.2 mW at 1.32V supply.

Figure 7:
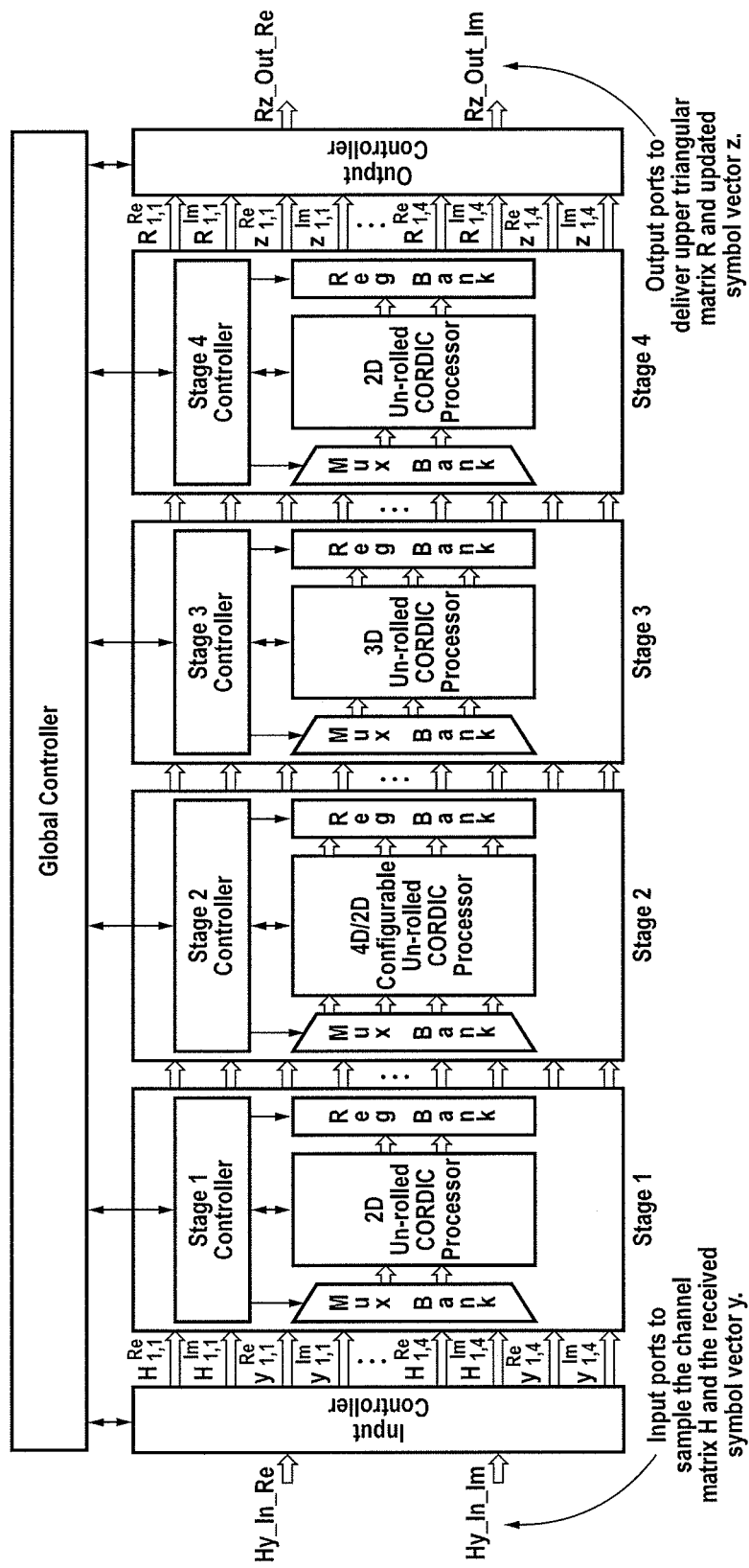
FIG. 7 shows a QRD core, in accordance with one embodiment of the present invention.

FIG. 7 shows the overall architecture of a QR Decomposition core, in accordance with one embodiment of the present invention. The overall architecture consists of a total of 6 pipelined stages, each with latency less than or equal to 40 cycles. The first stage is an Input Controller stage, that provides the interface with the preceding stage in the MIMO Receiver. This stage serves the purpose of reading in one 4×4 complex H matrix and four 4×1 complex y vectors every 40 clock cycles from the preceding stage. The Input Controller stage then stores the read data and uses them to supply appropriate input operands to the CORDIC processors. The last stage in the QRD architecture is an Output Controller stage that serves the purpose of transferring the output 4×4 complex R matrix and four output 4×1 complex z vectors ($z=Q^{H}*y$) to the succeeding K-Best MIMO Detector block every 40 clock cycles. Both the Input Controller and the Output Controller blocks read in or write out 1 complex number (2 16-bit Real numbers) each cycle, by following the scheduling shown in Table C.1 in Appendix C.

The four central stages, Stages-4, compute the QR Decomposition of input H matrix, as well as 4 z vectors, simultaneously, using un-rolled pipelined 2D, Householder 3D and 4D/2D Configurable CORDIC processors. Details about functionality and architecture of these un-rolled CORDIC processors are provided below. As shown in FIG. 7, each of these four central stages also contains a multiplexor (MUX) bank (MuxBank) and a register bank (RegBank) in the datapath, in addition to the un-rolled CORDIC processors. In each stage, the MuxBank serves the purpose of selecting the input operands for the CORDIC processor in that stage every clock cycle. The RegBank at the output of each stage is used to re-direct the CORDIC outputs to appropriate registers and to hold them until the current stage completes its desired computations and all outputs are ready to be passed to the next stage as inputs.

In terms of the control path, each of these stages contains an independent Stage Controller that controls the operation of the datapath modules, to enable them to per-form the required operations within the given number of clock cycles. Specifically, the Stage Controller provides the select and other control signals to direct appropriate data in and out of the CORDIC processor every cycle. The Stage Controller also provides the required control signals to the CORDIC processors to control their mode of operation (Vectoring or Rotation), rotation direction transfers and re-use of the pipelined CORDIC stages to maximize resource utilization. In addition to the individual stage controllers, the QRD architecture also contains a Global Controller that controls the overall operation of the complete QRD core. As mentioned, all 6 pipelined stages perform a certain fixed set of tasks every 40 clock cycles, independently of each other. Hence, the Global Controller contains a counter that provides a global count (from 1 to 40), in order to synchronize the operation of each of the 6 stages. The Global Controller also provides the required control signals to ensure correct functionality of the Input Controller and Output Controller blocks, as well as Stage Controller blocks within each central stage.

Note that the data format for input, output and internal data for the QR Decomposition core, is signed numbers in two's complement format with a word-length of 16 bits and 11 bits for the fractional part. Note that due to their larger dynamic range, the Householder 3D CORDIC processor uses an extra bit for the integer part, and hence requires a word-length of 17 bits. These word-length and number of bits for fractional part were derived using extensive bit-true simulations, such that the BER loss relative to the floating-point result is minimized. Also, the total latency of the architecture from input H and y matrices to output R and z matrices is 160 clock cycles. However, due to its deeply pipelined nature; the QRD architecture processes a new set of H and y matrices, and produces a new set of R and z output matrices every 40 clock cycles.

CORDIC Processor

The CORDIC algorithm uses a series of shift and addition operations to evaluate many basic arithmetic and mathematical functions, see "A unified view of CORDIC processor design," Wang, Piuri, and E. S. Jr. in Proc. of IEEE 39$^{th}$ Midwest symposium on circuits and systems, vol. 2, pp. 852-855, August 1996. It is also very suitable for implementing Givens rotations, using its Vectoring and Rotation modes, see "A survey of CORDIC algorithms for FPGA based computers," R. Andraka, Proc. of the 1998 ACM/SIGDA sixth international symposium on filed programmable gate arrays, pp. 191-200, February 1998. There are a number of ways to design the CORDIC processors, that implement the CORDIC algorithms. Hence, the architecture of the CORDIC processor, for the given application, depends on the latency and hardware resource constraints.

For the QR Decomposition architecture under consideration, a large number of Vectoring and Rotation operations need to be performed at each pipelined stage within 40 clock cycles, while trying to achieve the smallest gate count possible. In other words, the architectures for the CORDIC processors need to be designed with the primary aim of achieving high throughput, possibly performing 1 Vectoring or Rotation operation every cycle. And then, as the secondary aim, the area of the CORDIC processors should be reduced as much as possible, using various strategies. Iterative CORDIC processors pro-vide a minimum hardware solution, however, they have a considerably large processing latency, see "A survey of CORDIC algorithms for FPGA based computers," R. Andraka, Proc. of the 1998 ACM/SIGDA sixth international symposium on filed programmable gate arrays, pp. 191-200, February 1998. On the other hand, fully un-rolled Pipelined CORDIC processors offer very high throughput, however, their straightforward implementation poses very large resource requirements, see "A survey of CORDIC algorithms for FPGA based computers," R. Andraka, Proc. of the 1998 ACM/SIGDA sixth international symposium on filed programmable gate arrays, pp. 191-200, February 1998. A QR Decomposition architecture, in accordance with the present invention, uses an un-rolled, deeply pipelined architecture with iterative stages to design the 2D, Householder 3D and 4D/2D Configurable CORDIC processors, with major modifications to reduce the gate count and the number of cycles required for complete Vectoring and Rotation operations.

Figure 8:
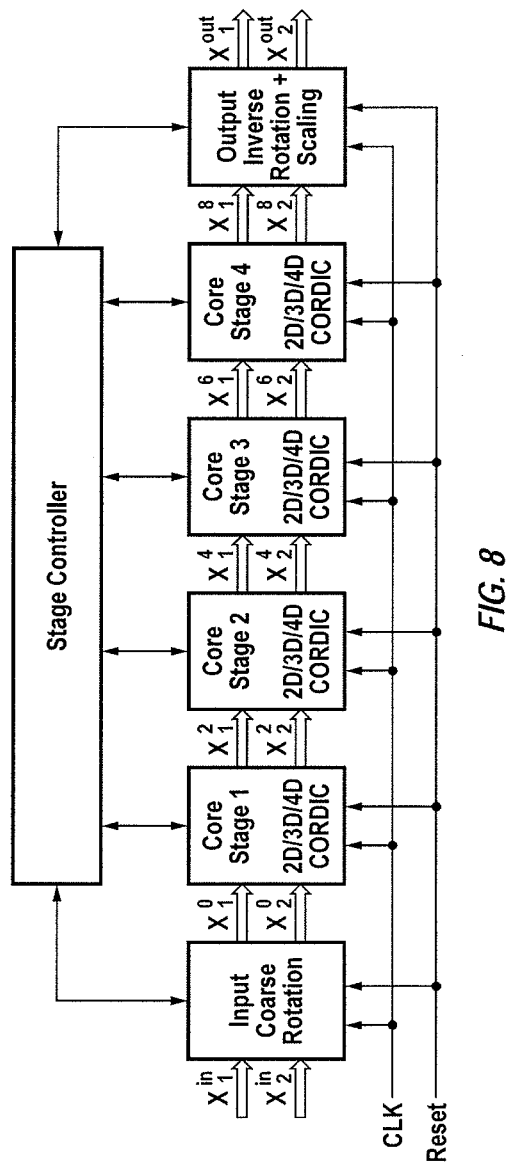
FIG. 8 shows a CORDIC processor, in accordance with one embodiment of the present invention.
Figure 9:
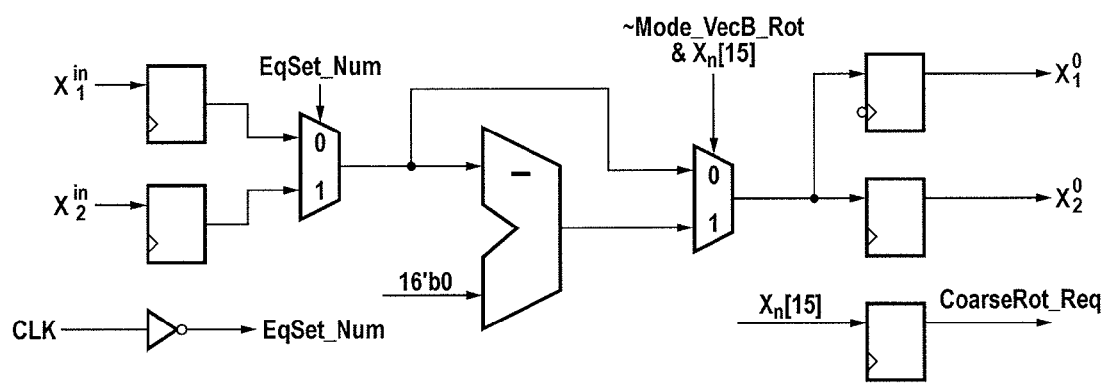
FIG. 9 shows an input coarse rotation stage for a 2D CORDIC processor, in accordance with one embodiment of the present invention.
Figure 10:
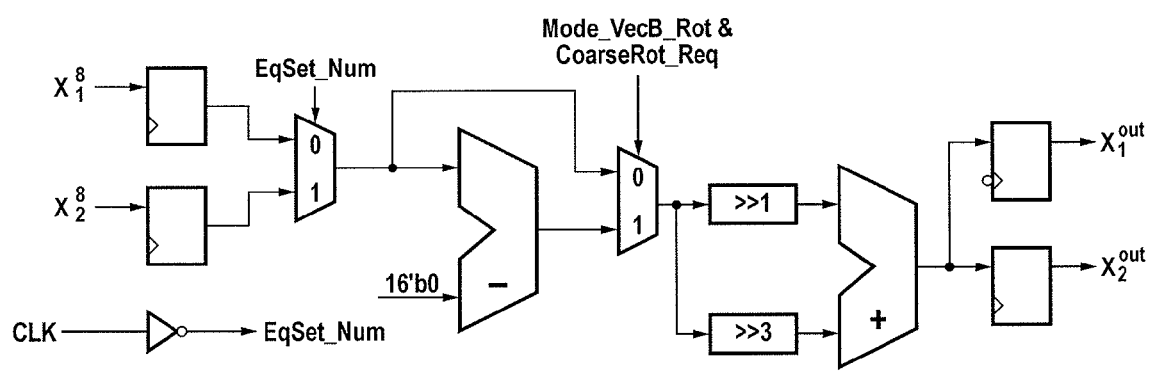
FIG. 10 shows an output coarse rotation and scaling stage for a 2D CORDIC processor, in accordance with one embodiment of the present invention.

FIG. 8 shows the architecture of a CORDIC processor used in a QRD core, in accordance with embodiment of the present invention. In general, the 2D, Householder 3D and 4D/2D Configurable CORDIC processors include multiple pipelined core stages, where each stage implements one or more of the CORDIC elementary rotation equations. Each CORDIC Core stage is designed to work in either Vectoring or Rotation mode, which in turn is controlled by the Stage Controller block. In addition to the Core stages that implement the elementary rotation equations, the CORDIC processors also include an input coarse rotation stage and an output stage that performs both inverse coarse rotation and output scaling. The architectures for these stages are shown in FIG. 9 and FIG. 10, respectively. The CORDIC Vectoring and Rotation algorithms are limited to rotation angles between $-\pi/2$ and $+\pi/2$, and hence for composite rotation angles larger than $\pi/2$, the input and output coarse rotation stages rotate the input and output vectors by $-\pi$ and $+\pi$, respectively. From a hardware perspective, this is implemented in the input coarse rotation stage by simply monitoring the sign of the input operands and negating (using the two's complement scheme) them, if required. Based on the input operands, the input coarse rotation stage generates the control signal "CoarseRot_Req", which is then used by the output inverse coarse rotation stage to decide whether to perform inverse rotation or not.

The output scaling stage scales the CORDIC outputs by a constant factor, in order to compensate for the CORDIC processing gain, described in sections above. The QRD architecture of the present invention approximates the scaling operation to reduce the circuit complexity. For example, for the 2D CORDIC case, implementation of the exact scaling by factor 0.6097 requires signed multipliers. However, approximation of this scaling by $2^{-1}+2^{-3}$ (0.6250) will allow its implementation with considerably lower circuit complexity, by only using hardwired shifts and signed addition, as shown in FIG. 10. Similarly, the Householder 3D and 4D CORDIC processors use approximate scale factors of 0.1875 ($2^{-3}+2^{-4}$) and 0.3125 ($2^{-2}+2^{-4}$), respectively. The impact of these approximations on the BER performance is very minor, as is described below. Also, note that based on MATLAB simulations, architectural decisions were made to use 8 CORDIC iterations.

2D CORDIC Processor

Figure 11:
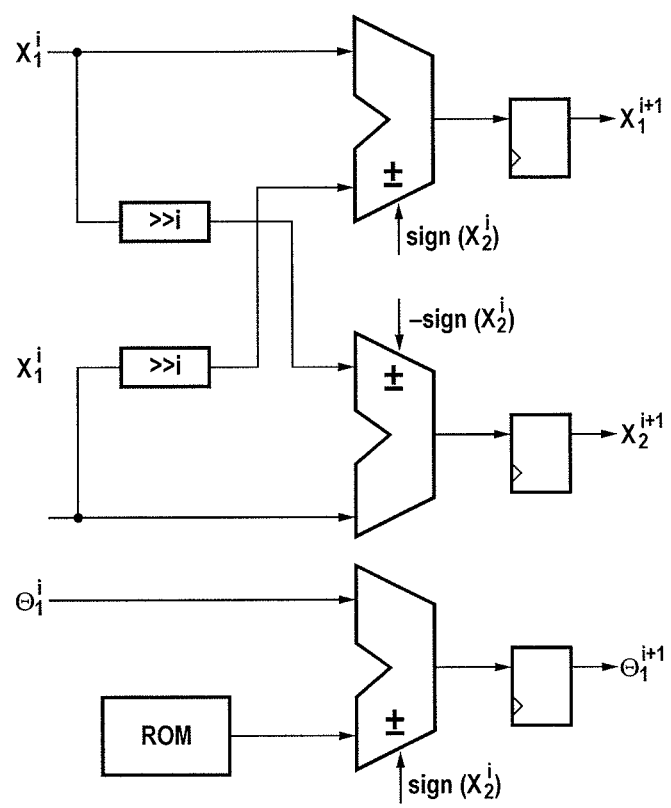
FIG. 11 is a block diagram of a 2D CORDIC processor, as known in the prior art.

The 2D CORDIC algorithm, described above, provides a method to implement the Vectoring and Rotation operations for Givens rotations. The CORDIC elementary rotation equations, shown in Eq. (5.1), are used to implement both Vectoring and Rotation operations, where the elementary rotation direction is calculated using the input vector co-ordinates for the Vectoring case, and using the residual angle for the Rotation case. Hence, a single stage architecture, for the 2D CORDIC processor can be designed to be programmable to execute appropriate CORDIC equations, depending on its mode of operation (Vectoring or Rotation). FIG. 11 shows the generic single stage architecture for 2D un-rolled CORDIC processor, derived using equation (5.1). As shown, the architecture uses a ROM module and a large amount of hardware resources for the angle datapath. Also, since it only implements one iteration of the CORDIC elementary rotation equation, it leads to low resource utilization and large hardware requirements. For example, for a 2D un-rolled CORDIC processor with 8 CORDIC iterations, a total of 8 instances of this single stage architecture will be required. The resulting CORDIC processor will take 8 clock cycles to complete Vectoring or Rotation operation for a single 2D vector and will require a total of 24 adders and 8 ROM modules.

Figure 12:
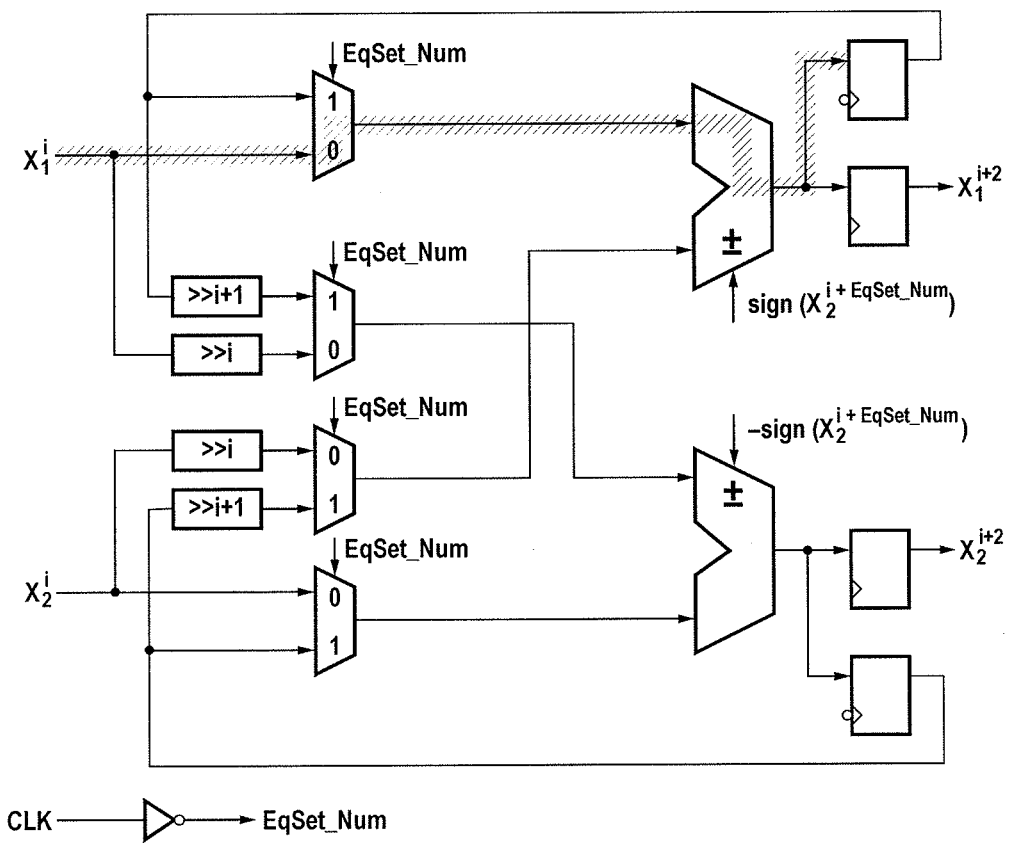
FIG. 12 is a block diagram of a 2D CORDIC processor, in accordance with one embodiment of the present invention.

FIG. 12 illustrates a single stage architecture for the 2D un-rolled CORDIC processor according to one embodiment of the present invention. The single stage architecture resolves these issues using two major improvement strategies, namely implicit angle transfer and re-use of hardware resources for execution of multiple CORDIC iterations in a single clock cycle using the same single stage. The implicit angle transfer computes the elementary rotation directions in the Vectoring mode, stores them in the Stage Controller registers, and utilizes them directly in the Rotation mode of operation. Thus, the CORDIC processor does not need to explicitly compute the rotation angle in the Vectoring mode and does not need to utilize and keep track of it to derive the elementary rotation directions. This results in hardware savings of around 30%, since the adders, registers, MUXs and the ROM that make up the angle datapath for each CORDIC stage can be removed.

Some embodiments of the present invention implement 2 sets of 2D CORDIC elementary rotation equations using the same single stage. The same set of 16-bit signed adders twice and MUXs are used to select inputs to these adders, with the clock signal acting as the MUX select signal. In the first half of the clock cycle, the inputs corresponding to the first set of elementary equations are passed to the adders. The adder outputs, from the first half of the clock cycle processing, are used as the adder inputs for the second half of the clock cycle. For each elementary equation set implementation, the elementary rotation directions are computed from the input operands, and are used to operate the signed adders in either addition or subtraction mode. Thus, using this strategy, only 4 instances of the single stage architecture shown in FIG. 12 will be required for the 2D un-rolled CORDIC processor with 8 CORDIC iterations. The resulting CORDIC processor will take 4 clock cycles to complete Vectoring or Rotation operation for a single 2D vector and will require a total of 8 adders and 0 ROM modules. Thus, this reduces the number of cycles required for Vectoring and Rotation operations required by a factor of 2, the amount of hardware required by a factor of 3 and increases the datapath hardware utilization to approximately 100%.

Also, since each CORDIC single stage needs to perform fixed shift, it can be performed using re-wiring of the input operands and hence the area intensive Barrel Shifters can be removed. Note that identical architectures of the 2D CORDIC processors are used in Stage 1 and Stage4 of the QR Decomposition core of the present invention. In Stage 1, it performs 4 2D Vectoring and 24 2D Rotation operations, and in Stage 3, it performs 3 2D Vectoring and 24 2D Rotation operations within 40 clock cycles.

Householder 3D CORDIC Processor

Figure 13:
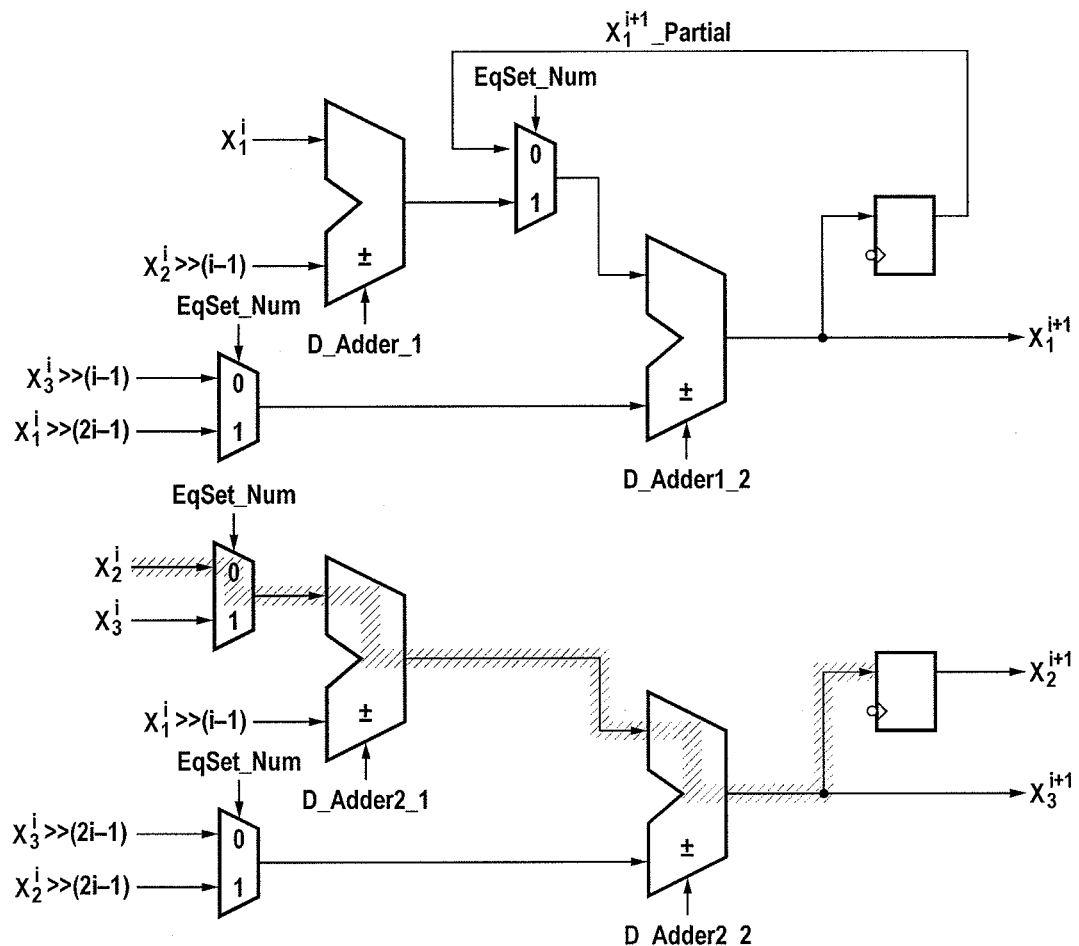
FIG. 13 is a block diagram of a 3D CORDIC processor, in accordance with one embodiment of the present invention.

The 3D un-rolled CORDIC processor performs Vectoring and Rotation operations on three-dimensional column vectors (3×1 real-valued vectors) using the Householder 3D CORDIC elementary rotation equations, shown in equation (5.8). The 3D un-rolled CORDIC processor consists of 4 pipelined single stages, each of which implements 2 sets of Householder 3D elementary rotation equations, within 2 clock cycles. FIG. 13 shows the architecture of a single stage of the Householder 3D un-rolled CORDIC processor, with critical path highlighted according to an embodiment of the present invention. Note that this architecture also uses the same area saving strategies that were used for the 2D CORDIC processor, described above.

As shown in FIG. 13, the four signed adders are used a total of 4 times, within 2 clock cycles, to implement the 2 iterations of the Householder 3D CORDIC equations. Note again that the MUXs, controlled by the clock signal, are used to provide appropriate inputs to the adders. The top two adders compute $X_1^{i+1}$ by adding the 4 terms in the first equation, shown in (5.8). The bottom two adders compute $X_2^{i+1}$ and $X_3^{i+1}$, in each half of a single clock cycle. The outputs $X_1^{i+1}$, $X_2^{i+1}$ and $X_3^{i+1}$ are then fed back as inputs to the same single stage, and the same procedure is used to compute $X_1^{i+2}$, $X_2^{i+2}$ and $X_3^{i+1}$, which serve as the final outputs of the single stage. Note that the Householder 3D CORDIC processor is used in the QR Decomposition Stage 3, and it performs 1 3D Vectoring and 12 3D Rotation operations within 34 clock cycles.

4D/2D Configurable CORDIC Processor

Stage 2 of the QR Decomposition core contains a 4D/2D configurable un-rolled CORDIC processor. This CORDIC processor consists of 8 pipelined single stages, each of which is programmable to operate in either 4D or 2D mode. In the 2D mode of operation, each single stage of the 4D/2D configurable CORDIC processor can perform 4 2D Vectoring or Rotation operations in parallel, in a single clock cycle. In the 4D mode of operation, it can perform a single Vectoring or Rotation operation, by implementing the 4 elementary rotation equations shown in 5.6, within a single clock cycle.

Figure 14:
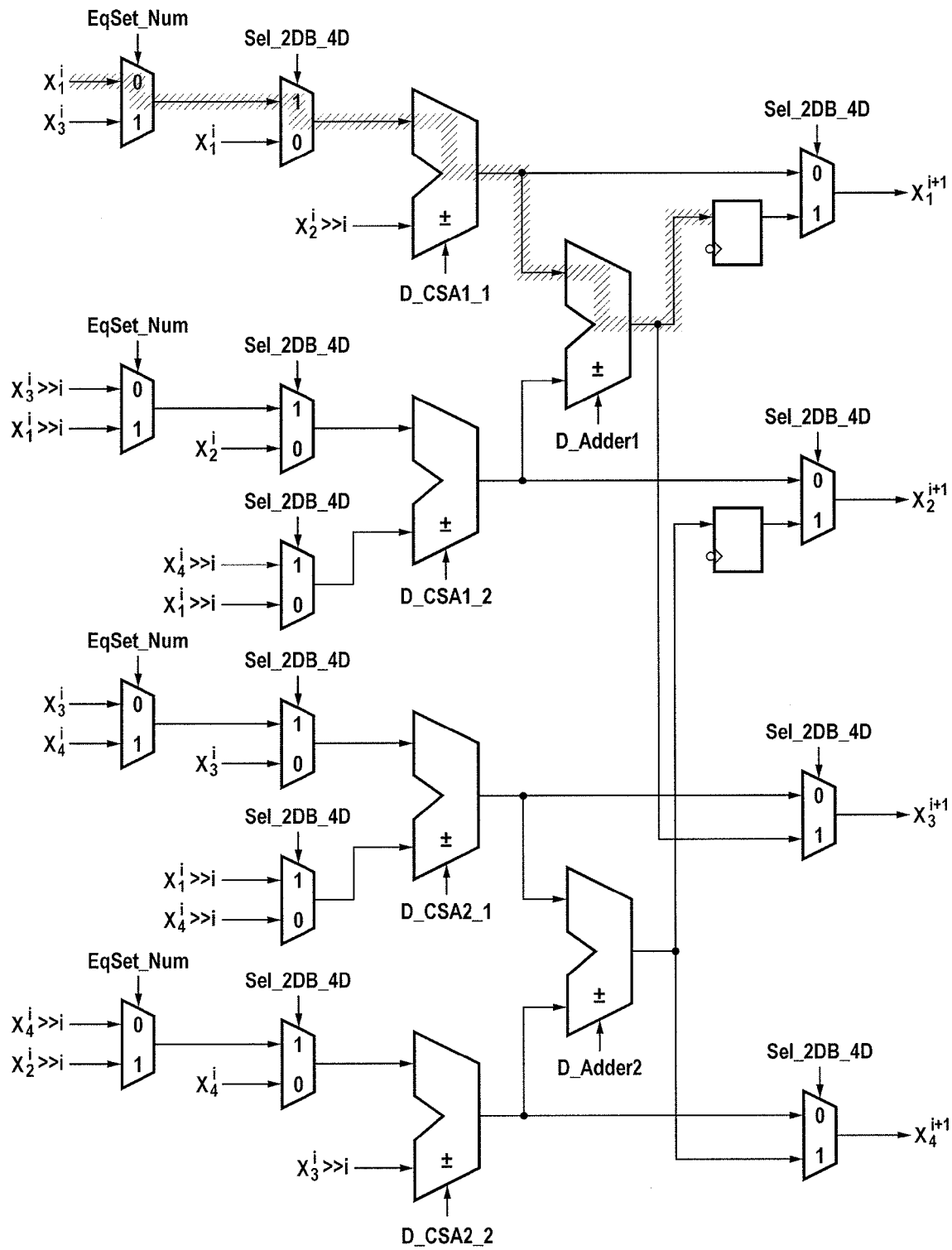
FIG. 14 is a block diagram of a 4D/2D configurable CORDIC processor, in accordance with one embodiment of the present invention.

FIG. 14 shows the architecture of a single stage of the 4D/2D configurable un-rolled CORDIC processor, with critical path highlighted. The MUXs select the input data and rotation directions for the adders according to the mode of operation (2D or 4D). Since, in the 4D mode of operation, each of these adders are used twice, the clock signal driven MUXs have also been cascaded to select the adder inputs. For the 4D mode of operation, the adders are used to compute $X_1^{i+1}$ and $X_2^{i+1}$ in the first half of the clock cycle, and to compute $X_3^{i+1}$ and $X_4^{i+1}$ in the second half of the clock cycle. In the 2D mode of operation, the CORDIC processor performs Vectoring and Rotation operations on two sets 2D vectors, $[X_1^i X_2^i]^T$ and $[X_3^i X_4^i]^T$, in parallel, in each half of the clock cycle. In other words, the adders compute $[X_1^{i+1} X_3^{i+1}]^T$ and $[X_3^{i+1} X_4^{i+1}]^T$ in the first half of the clock cycle, for the first set of two 2D input vectors. The same process is repeated in the second half of the clock cycle to compute updated vectors for the second set of two 2D input vectors.

The 4D/2D configurable un-rolled CORDIC processor performs a total of 1 4D Vectoring, 14 4D Rotation, 3 2D Vectoring and 18 2D Rotation operations within 36 clock cycles. This makes Stage 2 the most computation and hardware intensive stage within the complete QR Decomposition core. Also, due to the hardware intensive nature, the critical path of the single stage of the 4D/2D configurable CORDIC processor accounts for the critical path of the overall QR Decomposition core.

BER Simulation Results

The QR Decomposition operation does not directly estimate the transmitted vector, and hence it does not have a direct impact on the BER performance. However, the accuracy of the channel matrix QR Decomposition does have an effect on the MIMO detection process. In other words, a QRD core decomposes the channel matrix H and processes received symbol vectors y, to produce an upper-triangular matrix R and updated symbol vectors z ($z=Q^{H}*y$). The matrix R and symbol vectors z are then used by the MIMO detector to estimate the transmitted vectors ŝ. These estimated transmitted vectors, ŝ, are then compared to the actual transmitted vectors, s, to quantize the BER performance of the MIMO Receiver (QRD+MIMO Detector).

Thus, sources of inaccuracy in QR Decomposition will produce R matrix and z vectors that may not be exactly the same as the actual R and z attained mathematically (using ideal QRD) in floating-point format. Use of these perturbed R and z matrices for MIMO detection would lead to errors in estimating the transmitted vector ŝ, which then results in BER performance degradation compared to ideal QRD. The BER performance of the QRD scheme, in accordance with the present invention, and its VLSI implementation is quantified by comparing floating-point and fixed-point QRD models when combined with a 4×4 64-QAM Hard-output K-Best detector, with K=10. The combined MATLAB models were simulated for 100,000 packets, where each packet consists of 4×$\log_2$(Q)×NT=4×6×4=96 bits (9.6 Mbits in total) for 4×4 MIMO system.

Figure 15:
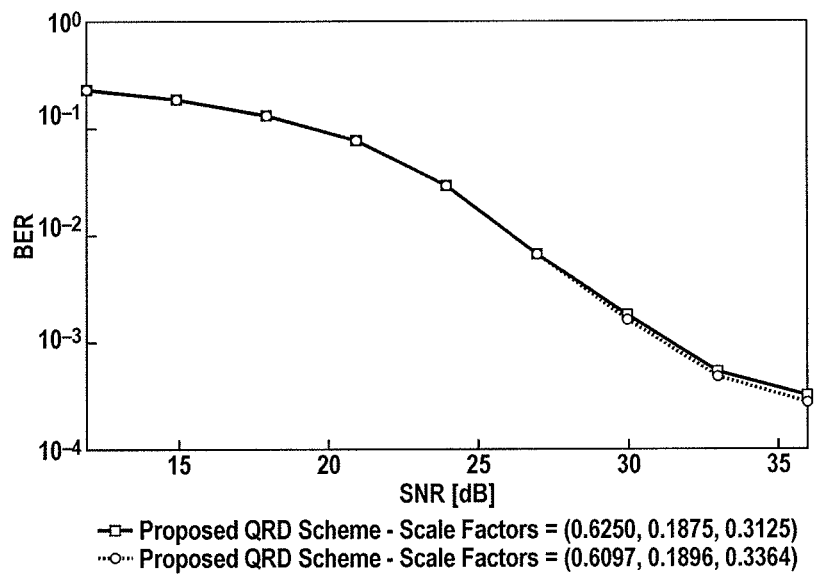
FIG. 15 shows the BER performance of a QRD core with different CORDIC processing gain scale factors, in accordance with one embodiment of the present invention.

As mentioned above, the QRD architecture, in accordance with the present invention, uses approximations for the actual scale factors for compensating CORDIC processing gain, in order to simplify the VLSI implementation of the scaling operation. In other words, the scale factors 0.6097, 0.1896 and 0.3364 for 2D, Householder 3D and 4D CORDIC processors have been approximated with 0.6250 ($2^{-1}+2^{-3}$), 0.1875 ($2^{-3}+2^{-4}$) and 0.3125 ($2^{-2}+2^{-4}$), respectively. However, as stated above, these approximations might lead to increased inaccuracy in the resulting R matrix and z vectors, and hence might cause BER performance degradation. FIG. 15 shows the BER performance of the QRD+K-Best MIMO detector integration with actual and approximated scale factors. As shown, the approximation of the actual scale factors only leads to a BER performance loss of 0.14 dB at BER=$10^{-3}$. However, in terms of hardware implementation, this leads to significant hardware savings since the actual signed multiplication can be implemented using only hardwired shifts and signed addition.

Figure 16:
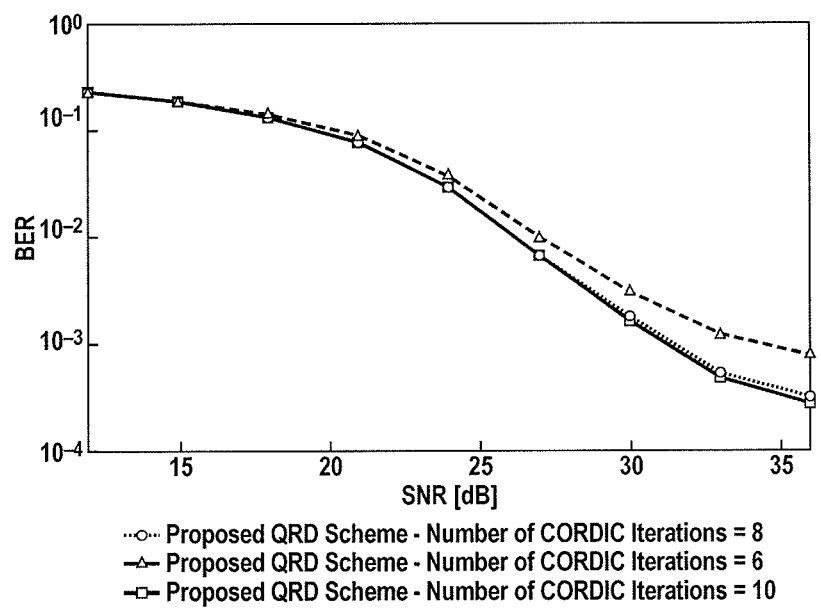
FIG. 16 shows the BER performance of a QRD core with different number of CORDIC algorithm iterations, in accordance with one embodiment of the present invention.

In the QRD architecture, in accordance with embodiments of the present invention, the CORDIC algorithms are utilized to perform vector rotation. The accuracy of the vector rotations depends on the number of iterations used for the CORDIC algorithm. In other words, a larger number of CORDIC iterations will lead to better accuracy, however, will also lead to larger hardware complexity. Hence, in order to decide on the number of CORDIC algorithm iterations to be used, the MATLAB models for the QRD of the present invention were simulated with different number of CORDIC iterations. FIG. 16 shows the BER curves attained using these MATLAB simulations. From these BER curves, it can be noticed that QRD using 6 CORDIC iterations leads to a significant BER performance degradation, compared to QRD with 8 CORDIC iterations. On the other hand, QRD using 10 CORDIC iterations yields a BER performance improvement of approximately 0.28 dB at BER=$10^{-3}$. However, from an implementation perspective, use of 10 CORDIC iterations leads to a much higher computational complexity, which results in either large QRD processing latency or large hardware and power requirements. This justifies using 8 iterations for 2D, Householder 3D and 4D/2D configurable CORDIC processors.

Figure 17:
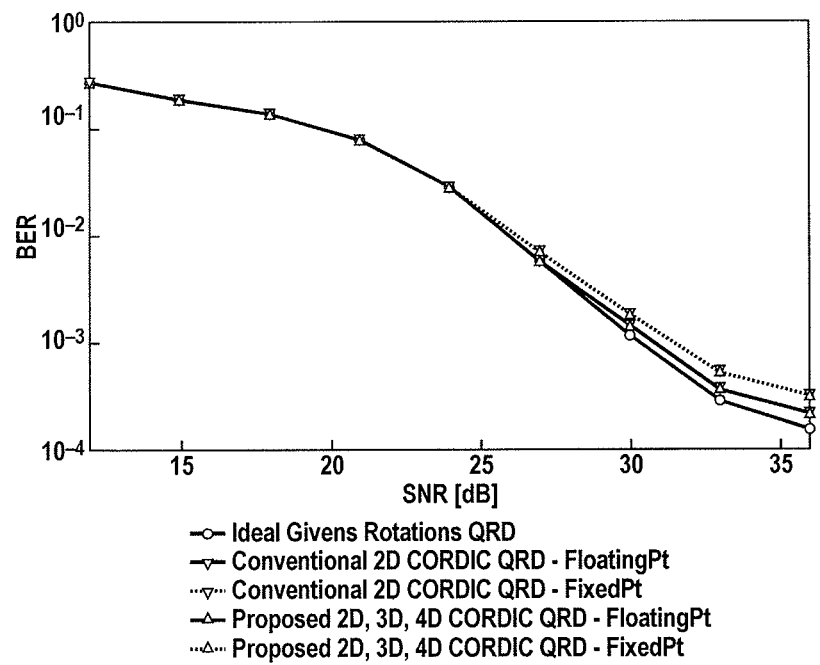
FIG. 17 shows the BER performance of a different QRD cores for 4×4 matrix decomposition combined with 64-QAM K-best MIMO detector, in accordance with one embodiment of the present invention.

FIG. 17 shows the BER curves obtained by simulating the combination of QR Decomposition and K-Best MIMO Detector for different QRD schemes. The QR Decomposition MATLAB models use 8 CORDIC iterations and the scale factors of 0.6250, 0.1875 and 0.3125 for 2D, Householder 3D and 4D CORDIC processors, respectively. From FIG. 17, it can be noticed that the BER performance for the QR Decomposition scheme is identical to that of the QRD scheme using the conventional sequence of Givens rotations, for both floating-point and fixed-point models. This can be justified by noticing that the average absolute difference between the R matrix and the z vectors produced by both of these schemes is on the order of $10^{-5}$ for floating-point models and on the order of $10^{-3}$ for fixed-point models. Note that these floating-point and fixed-point MATLAB models for QR Decomposition use the CORDIC algorithms for performing Givens rotations. FIG. 17 also shows the BER curve for QR Decomposition using ideal Givens rotations, implemented in floating-point arithmetic (as opposed to implementing them using the CORDIC algorithm). It can be noticed that the BER performance for QRD using ideal Givens rotations is marginally better compared to that when Givens rotations are implemented using the CORDIC algorithm. This can be explained by the fact that the CORDIC algorithm just approximates actual vector rotations, with the accuracy dependent on the number of CORDIC algorithm iterations used and the compensation scale factors used.

Test Results and Design Comparison

Figure 18:
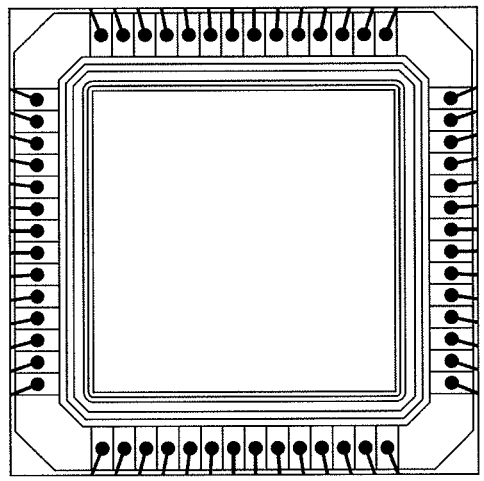
FIG. 18 is a die micrograph of a QRD core, in accordance with one embodiment of the present invention.
Figure 19:
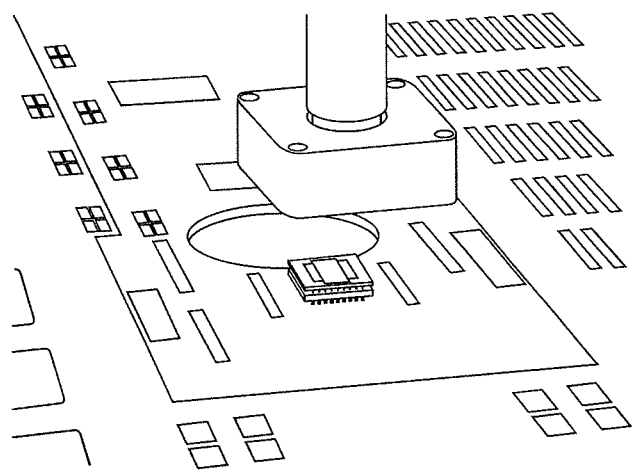
FIG. 19 is picture illustrating a test setup according to an embodiment of the present invention.

A QR Decomposition core, in accordance with the present invention, was fabricated in a 0.13 µm IBM 1P8M CMOS process and was tested using an Agilent(Verigy) 93000 SoC high-speed digital tester and a Temptronic TP04300 thermal forcing unit. The die micrograph for the QRD chip is shown in FIG. 18. The test setup consisting of the 93K SoC tester, Temptronic TP04300 thermal forcing unit, load board and the DUT is shown in FIG. 19. The nominal core supply voltage is 1.2 V, whereas the I/O voltage is 2.5 V. The functionality of the QRD core was verified by generating and passing channel matrices and received symbol vectors at different SNR values to the chip through the tester and comparing the QRD outputs with the expected values from the bit-true simulations both from MATLAB and Verilog HDL simulations. The BER performance of the QRD core was measured as follows:

1. Complex-valued random Gaussian channel characteristic matrix, updated every four channel uses, was generated and was used to transmit the symbol vectors.
2. For a given SNR value, additive white Gaussian noise with the desired variance was generated and was used along with the channel matrix to derive the received symbol vectors.
3. A test vector, including the input channel matrix and received symbols, as well as all the required control and enable signals, was generated using MATLAB.
4. This generated test vector was then converted to a VCD file using ModelSim, a Verilog HDL simulator.
5. The V93K TestGenerator tool, see "How to migrate HDL Design to ATE Test Plan Quickly and Efficiently—The V93K_TestGenerator Tool", by Dimpesh Patel, Glenn Gulak, and Jeetendar Narsinghani, Jun. 27, 2008, was then used to convert the test vector VCD file to timing files (".tim"), configuration files (".pin"), and binary test vector files (".binl") required for testing.
6. The core supply voltage along with the I/O supply voltage are set appropriately.
7. These files were loaded onto the V93K SoC tester and were used to supply input test vectors to the QRD chip.
8. An at-speed test was run on the QRD chip and the outputs are compared against the desired bit stream generated by the MATLAB simulation.

Figure 20:
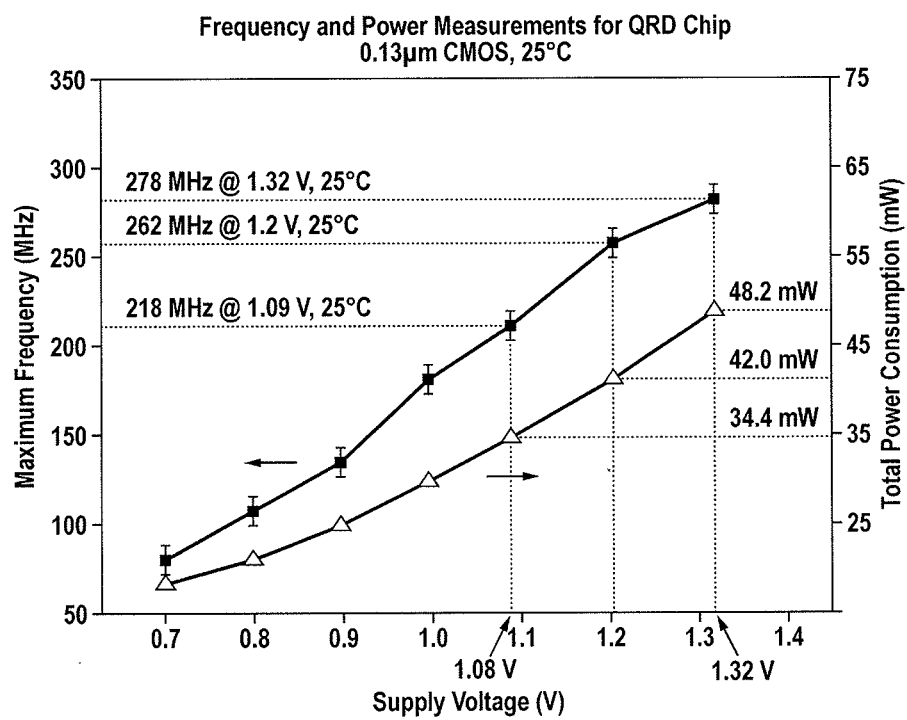
FIG. 20 shows a measured maximum operating frequency and power consumption as a function of supply voltage, in accordance with one embodiment of the present invention.

FIG. 20 shows a Shmoo plot depicting the maximum operating frequency and the total power dissipation of the design versus the supply voltage at 25° C. A total of five chips were tested, where the average and the max/min values of the achieved frequency have been shown in FIG. 20. The detailed measurement results are presented in Appendix D in Table D.1 to Table D.15. At 25° C. and 1.32V supply voltage, the QRD design operates at a clock rate up to 278 MHz and consumes 48.2 mW of power. The temperature was forced to be at 25° C. using the Temptronic TP04300 thermal forcing unit. Also, using this Temptronic TP04300 thermal forcing unit, test results at 0° C. and 85° C. yield clock rates of 292 MHz and 254 MHz, while dissipating 51.5 mW and 43.7 mW, respectively, at 1.32V supply. The complete measurement results at these temperatures have been presented in Appendix D.

TABLE IV

| Reference | [34]-2008 | [33]-2007 | [47]-2009 | [36]-2007 | This work |
|---|---|---|---|---|---|
| Process | 0.13 µm | 0.18 µm | 0.18 µm | 0.25 µm | 0.13 µm |
| QRD Algorithm Used | MGS | MGS | MGS | Givens Rot | Hybrid |
| Input Matrix Size | 4 × 4 Complex | 4 × 4 Real | 4 × 4 Real | 4 × 4 Complex | 4 × 4 Complex |
| QRD Processing Mode | Real | Real | Real | Complex | Real |
| QRD Processing Latency | 139 cycles | 67 cycles | 44 cycles | 67 cycles | 40 cycles |
| Max Clock Frequency | 269 MHz | 277 MHz | 270 MHz | 125 MHz | 278 MHz |
| QRD Processing Latency [ns] | 516 ns | 241 ns | 162 ns | 536 ns | 144 ns |
| Core Area | 23.2 KG | 72 KG | 51 KG | 54 KG | 36 KG |
| QRD Processing Efficiency (1/ns · KG) (×10³) | 5.346 | 0.923 | 1.936 | 2.212 | 12.352 |
| Tested Chip | No | No | No | No | Yes |
| Power Consumption | N/A | N/A | N/A | N/A | 48.2 mW @ 1.32V |

Table IV shows the measured results for the QRD chip of the present invention and compares it to other published state-of-the-art QR Decomposition implementations for decomposing 4×4 matrices. For the MMSE QR Decomposition design presented in "VLSI Implementation of a high-speed iterative sorted MMSE QR decomposition." P. Luethi, A. Burg, S. Haene, D. Perels, N. Felber, and W. Fichtner, Proc. IEEE ISCAS 2007, pp. 1421-1424, May 2007, new Q and R matrices are produced every 67 cycles, running at 125 MHz, and the total core area required is 54 KG. Singh, Prasad, and Palsara in "VLSI Architecture for Matrix inversion using modified Gram-Schmidt based QR decomposition," International conference on VLSI design, pp. 836-841, January 2007, use log-domain computations to simplify implementation of multiplication, division and square-root operations in the Modified Gram-Schmidt (MGS) algorithm. However, this scheme requires considerable storage space to hold the look-up tables, and hence it requires large core area, as shown in Table IV. Note that the core area and processing latency numbers here are given for the complete matrix inversion operation, which requires an additional matrix multiplication stage after QR Decomposition. On the other hand, P. Salmea, A. Burian, H. Sorokin, and J. Takala in "Complex-valued QR decomposition implementation for MIMO receivers," in Proc. IEEE ICASSP 2008, pp. 1433-1436, April 2008, present a low complexity approximation of the inverse square-root function to simplify the implementation of the division by norm operations in the MGS algorithm. This leads to a considerably lower gate count of 23.2 KG, however, the QR Decomposition processing latency for this architecture is 139 cycles. In comparison, the novel QR Decomposition scheme and architecture provided by embodiments of the present invention output a new 4×4 complex R matrix and four 4×1 complex z vectors every 40 cycles, at a clock frequency of 278 MHz, and requires a gate count of 36 KG. Thus, this architecture achieves the lowest QRD processing latency, while still achieving the second lowest core area.

As can be noticed from Table IV, some of the reference QRD chips have been designed for processing matrices with dimensions other than 4×4 complex. Hence, to allow fair comparison, we introduce a new figure of merit, QR Processing Efficiency, as follows:

$$QR \text{ Processing Efficiency} \triangleq \frac{\text{Total } H \text{ Matrix Real Element Count}}{\text{Gate Count} \times \text{Processing Latency}} \quad (5.12)$$

Figure 21:
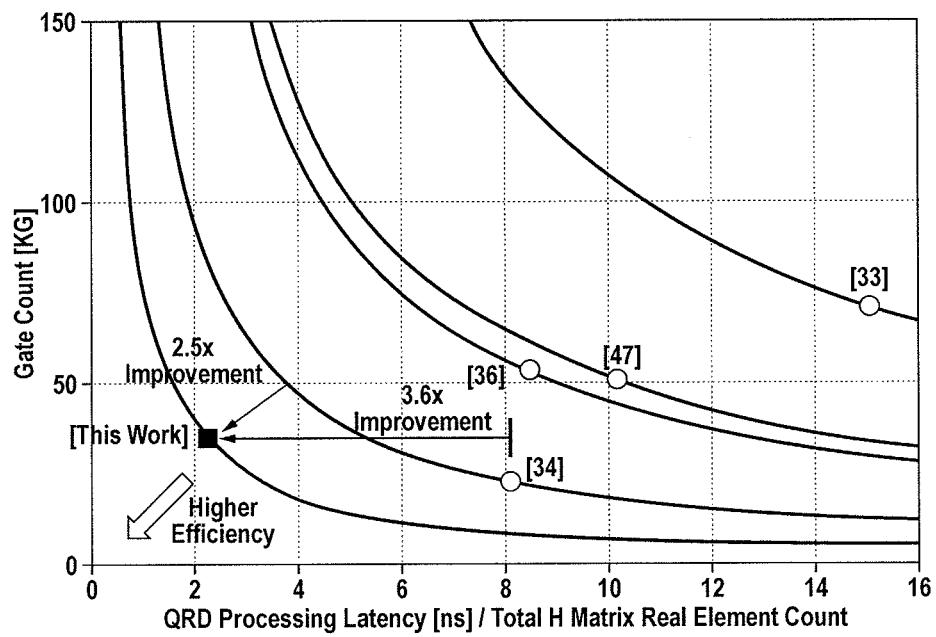
FIG. 21 is shows a comparison of QR processing efficiency between an embodiment of a QRD of the present invention and a conventional QRD.

Note that for complex matrices, the Total H Matrix Real Element Count in equation 5.12 is attained by first using Real Value Decomposition (RVD) to convert the complex matrix to its real counterpart, and then by counting the total number of elements in the real-valued matrix. FIG. 21 shows the QR Processing Efficiency comparison between the reference QRD chips and the QRD in accordance with the present invention. Each hyperbola in FIG. 21 represents a constant value of QR Processing Efficiency (computed by taking the reciprocal of the product of the two axes) for each QRD design. Note that since QR Processing Efficiency is the reciprocal of the product of the two axes, the distance of the hyper-bola to the origin is inversely proportional to the QR Processing Efficiency metric. In other words, hyperbolas that are relatively closer to the origin represent larger value of QR Processing Efficiency, and hence a better QRD design. Since the hyperbola for the presented QRD design is closest to the origin, the presented design attains the highest QR Processing Efficiency. From FIG. 21 and Table IV, the QRD core of the present invention provides a 3.6× reduction in processing latency (for 4×4 complex case) and a 2.5× increase in QR Processing Efficiency, compared to the best reported design referenced in "Complex-valued QR decomposition implementation for MIMO receivers," by P. Salmela, A. Burian, H. Sorokin, and J. Takala in Proc. IEEE ICASSP 2008, pp. 1433-1436, April 2008.

In order to fulfill the aggressive requirements of new 4G wireless standards, QR Decomposition implementations are required that decompose large complex channel matrices with minimum possible processing latency, silicon area and power consumption requirements. However, for decomposition of large channel matrices, the state-of-the-art QRD implementations cause high computational complexity and throughput bottlenecks, which leads to either large QRD Processing Latency or to large area and power requirements.

Embodiments of the present invention provide a hybrid QR Decomposition scheme that reduces the number of computations required and increases their execution parallelism by using a unique combination of Multi-dimensional Givens rotations, Householder transformations and Conventional 2D Givens rotations. The computational complexity is further reduced by using the CORDIC algorithm to implement these multi-dimensional vector rotations. A semi-pipelined semi-iterative architecture is presented for the QRD core, that uses innovative design ideas to develop 2D, Householder 3D and 4D/2D Configurable CORDIC Processors, such that they can perform the maximum possible number of Vectoring and Rotation operations within the given number of cycles, while minimizing gate count and maximizing resource utilization. The test results for the QRD chip, fabricated in 0.13 µm 1P8M CMOS technology, demonstrate that the QRD chip attains the lowest reported processing latency of 40 clock cycles (144 ns) at 278 MHz for 4×4 complex matrices at room temperature. It also outperforms all of the previously published QRD designs by offering the highest QR Processing Efficiency, while consuming only 0.3 mm silicon area and 48.2 mW.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method for transforming a first matrix using a computer comprising a pipelined structure including an input stage, a plurality of Coordinate Rotation Digital Computer (CORDIC) processors, and an output stage, the method comprising:
   receiving and storing the first matrix by the input stage;
   generating, using the CORDIC processors, a second matrix from the first matrix using a real-value decomposition (RVD), wherein elements of the second matrix comprise real values determined based on either real part or imaginary part of a corresponding element in the first matrix; and
   performing, using CORDIC processors, a plurality of Givens rotation operations and at least one multi-dimensional Householder reflection operation on one or more elements of the second matrix to generate a third matrix, wherein each Givens rotation operation annihilates at least one element of the third matrix and each multi-dimensional Householder reflection operation annihilates at least two elements of the third matrix.

2. The method of claim 1 wherein the third matrix is a triangular matrix.

3. The method of claim 1 wherein performing the plurality of Givens rotation operations comprises:
   concurrently performing a plurality of two-dimensional Givens rotation operations on a plurality of independent sets of rows of the second matrix.

4. The method of claim 1 wherein performing the multi-dimensional Householder reflection operation comprises:
   performing at least one multi-dimensional Householder reflection operation to concurrently annihilate two or more elements of the third matrix that correspond to common pivot rows.

5. The method of claim 1 wherein performing the plurality of Givens rotation operations comprises:
   performing at least one four-dimensional Givens rotation to concurrently annihilate three elements of the third matrix.

6. The method of claim 1 wherein the third matrix corresponds to a triangular matrix R in QR decomposition of the first matrix.

7. The method of claim 1 wherein the first matrix represents a channel between a plurality of transmit antennas and a plurality of receive antennas, the method further comprising:
generating a fourth matrix by performing the plurality of Givens rotation operations and the at least one Householder reflection operation on a matrix of received signals.

8. The method of claim 1 wherein the first matrix comprises a plurality of complex value elements.

9. The method of claim 1, wherein performing the plurality of Givens rotation operations comprises:
performing the plurality of Givens rotations on the one or more elements of the second matrix according to a predefined sequence to maintain symmetry between adjacent columns of one or more intermediate matrices.

10. A processor comprising a pipelined structure including an input stage, a plurality of Coordinate Rotation Digital Computer (CORDIC) processors, and an output stage, the processor being configured to:
receive and store a first matrix by the input stage;
generate, using the CORDIC processors, from the first matrix, a second matrix using a real-value decomposition (RVD), the second matrix comprising real valued elements determined based on either real part or imaginary part of a corresponding element in the first matrix; and
perform, using the CORDIC processors, a plurality of Givens rotation operations and at least one multi-dimensional Householder reflection operation on one or more elements of the second matrix to generate a third matrix, wherein each Givens rotation operation annihilates at least one element of the third matrix and each multi-dimensional Householder reflection operation annihilates at least two elements of the third matrix.

11. The processor of claim 10 wherein the third matrix is a triangular matrix.

12. The processor of claim 10 wherein the processor is further configured to concurrently perform a plurality of two-dimensional Givens rotation operations on a plurality of independent sets of rows of the second matrix.

13. The processor of claim 10 wherein the processor is further configured to perform at least one multi-dimensional Householder reflection operation to concurrently annihilate two or more elements of the third matrix that correspond to common pivot rows.

14. The processor of claim 10 wherein the processor is further configured to perform at least one four-dimensional Givens rotation to concurrently annihilate three elements of the third matrix.

15. The processor of claim 10 wherein the third matrix corresponds to a triangular matrix R in QR decomposition of the first matrix.

16. The processor of claim 10 wherein the first matrix represents a channel between a plurality of transmit antennas and a plurality of receive antennas, and the processor is further configured to generate a fourth matrix by performing the plurality of Givens rotation operations and the at least one Householder reflection operation on a matrix of received signals.

17. The processor of claim 10 wherein the first matrix comprises a plurality of complex value elements.

18. The processor of claim 10 wherein the plurality of Givens rotation operations and the at least one Householder reflection operation are performed using the CORDIC processors.

* * * * *